US007137888B2

(12) United States Patent
Glavich et al.

(10) Patent No.: US 7,137,888 B2
(45) **Date of Patent: *Nov. 21, 2006**

(54) GAMING DEVICE HAVING WILD INDICATORS

(75) Inventors: Paulina Glavich, Reno, NV (US); Joseph E. Kaminkow, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/015,842

(22) Filed: Dec. 16, 2004

(65) Prior Publication Data

US 2005/0101380 A1 May 12, 2005

Related U.S. Application Data

(63) Continuation of application No. 09/960,883, filed on Sep. 21, 2001, now Pat. No. 6,866,583.

(51) Int. Cl.

| | |
|---|---|
| ***A63F 13/00*** | (2006.01) |
| ***A63F 9/24*** | (2006.01) |
| ***A63F 1/00*** | (2006.01) |
| ***G06F 17/00*** | (2006.01) |
| ***G06F 19/00*** | (2006.01) |

(52) U.S. Cl. ........................... 463/20; 463/16; 463/21; 463/25; 463/46; 273/138.1

(58) Field of Classification Search .................... 463/1, 463/2, 7, 9, 13, 16–22, 25, 26, 30, 36, 38, 463/46; 273/138.1, 242, 138.2, 461, 143 R, 273/143 B See application file for complete search history.

(56) References Cited

U.S. PATENT DOCUMENTS 4,836,546 A * 6/1989 DiRe et al. .................. 463/18

(Continued)

FOREIGN PATENT DOCUMENTS

AU 199717601 B2 9/1997

(Continued)

OTHER PUBLICATIONS

Black Swan Paytable Display written by IGT, published prior to 2001.

(Continued)

*Primary Examiner*—Xuan M. Thai
*Assistant Examiner*—Binh-An D. Nguyen
(74) *Attorney, Agent, or Firm*—Bell, Boyd & Lloyd LLC

(57) ABSTRACT

A gaming device having wild indicator symbols associated with symbols displayed within a display device on a set of reels. The wild indicator symbols may also be associated with a card or plurality of cards within a display device. A processor determines whether the wild indicators will be associated with the symbols or cards and also determines if the wild indicators will be activated. If the wild indicators are activated, the processor transforms those symbols or cards associated with the wild indicators into wild symbols or wild cards.

31 Claims, 21 Drawing Sheets

U.S. PATENT DOCUMENTS

| | | | | |
|---|---|---|---|---|
| 5,019,973 | A | 5/1991 | Wilcox et al. | |
| 5,098,107 | A | 3/1992 | Boylan et al. | |
| 5,282,633 | A | 2/1994 | Boylan et al. | |
| 5,308,065 | A | 5/1994 | Bridgeman et al. | |
| 5,332,219 | A | 7/1994 | Marnell et al. | |
| 5,332,228 | A | 7/1994 | Schultz | |
| 5,373,440 | A * | 12/1994 | Cohen et al. | 705/14 |
| 5,423,539 | A | 6/1995 | Nagao | |
| 5,431,408 | A | 7/1995 | Adams | |
| 5,449,173 | A | 9/1995 | Thomas et al. | |
| 5,762,552 | A | 6/1998 | Vuong et al. | |
| 5,772,506 | A | 6/1998 | Marks et al. | |
| 5,810,361 | A | 9/1998 | Kadlic | |
| 5,823,873 | A | 10/1998 | Moody | |
| 5,882,261 | A | 3/1999 | Adams | |
| 5,947,821 | A | 9/1999 | Stone | |
| 5,980,384 | A | 11/1999 | Barrie | |
| 6,004,207 | A | 12/1999 | Wilson, Jr. et al. | |
| 6,059,289 | A | 5/2000 | Vancura | |
| 6,059,658 | A | 5/2000 | Mangano et al. | |
| 6,089,977 | A | 7/2000 | Bennett | |
| 6,117,009 | A | 9/2000 | Yoseloff | |
| 6,120,031 | A | 9/2000 | Adams | |
| 6,120,378 | A * | 9/2000 | Moody et al. | 463/20 |
| 6,159,095 | A | 12/2000 | Frohm et al. | |
| 6,190,254 | B1 | 2/2001 | Bennett | |
| 6,190,255 | B1 | 2/2001 | Thomas et al. | |
| 6,220,959 | B1 | 4/2001 | Holmes, Jr. et al. | |
| 6,251,013 | B1 | 6/2001 | Bennett | |
| 6,290,600 | B1 | 9/2001 | Glasson | |
| 6,299,165 | B1 | 10/2001 | Nagano | |
| 6,299,170 | B1 | 10/2001 | Yoseloff | |
| 6,302,398 | B1 | 10/2001 | Vecchio | |
| 6,311,976 | B1 | 11/2001 | Yoseloff et al. | |
| 6,322,078 | B1 | 11/2001 | Adams | |
| 6,358,144 | B1 | 3/2002 | Kaddlic et al. | |
| 6,419,579 | B1 | 7/2002 | Bennett | |
| 6,428,412 | B1 | 8/2002 | Anderson et al. | |
| 6,439,993 | B1 | 8/2002 | O'Halloran | |
| 6,439,995 | B1 | 8/2002 | Hughs-Baird et al. | |
| 6,454,266 | B1 | 9/2002 | Breeding et al. | |
| 6,494,454 | B1 | 12/2002 | Adams | |
| 6,561,904 | B1 | 5/2003 | Locke et al. | |
| 6,604,740 | B1 | 8/2003 | Singer et al. | |
| 6,616,142 | B1 | 9/2003 | Adams | |
| 6,761,632 | B1 | 7/2004 | Bansamer et al. | |
| 6,780,109 | B1 * | 8/2004 | Kaminkow | 463/20 |
| 6,866,583 | B1 * | 3/2005 | Glavich et al. | 463/20 |
| 2001/0019965 | A1 | 9/2001 | Ochi | |
| 2003/0203753 | A1 * | 10/2003 | Muir et al. | 463/20 |

FOREIGN PATENT DOCUMENTS

| | | | |
|---|---|---|---|
| AU | WO 9732285 | | 9/1997 |
| AU | 199747657 | B2 | 12/1997 |
| AU | 722 969 | B | 6/1998 |
| AU | 199917318 | A1 | 9/1999 |
| EP | 0984408 | A2 | 3/2000 |
| GB | 2 353 128 | A | 2/2001 |
| WO | WO 00/66235 | | 11/2000 |
| WO | WO 00/76606 | A1 | 12/2000 |

OTHER PUBLICATIONS

Boot Scootin Article written by Strictly Slots/Aristocrat Leisure Industries, PTY Ltd., published date unknown.

Break the Spell Article written by Strictly Slots/Atronic Casino Technology, Ltd., published in Sep. 2000.

Break the Spell Atronic Web Page, published in January 2001.

Break the Spell Brouchure, published in 1999.

Cash Chameleon Article written by Strictly Slots/Aristocrat Leisure Industries, PTY Ltd., published in Apr. 2001.

Cossack Dance Advertisement written by Olympic Video Gaming, published prior to 2002.

Description of Symbol Feature in Australian UFO Gaming Machine written by Barcrest Ltd., published in 1995.

Double Diamond Line Advertisement written by Bally Gaming Systems, published in 2000.

Enchanted Forest™ Gaming Description from Aristocrat, available in 1994.

Enchanted Unicorn Advertisement written by IGT, published in 2001.

Fishin' Buddies Article published in Strictly Slots/Anchor Games, published in Apr. 2001.

Happy Camper Advertisement written by IGT, published in 2001.

Introducing the "Smiling Ape" Machine Advertisement (including Joker's Wild Poker description) written by IGT, published prior to 2001.

Jackpot Party Brochure and Articles writtn by WMS Gaming, Inc, published in 1988.

Joker's Wild Advertisement written by IGT, published prior to 2001.

Little Green Men, Jr., Advertisement written by A.C. Coin and Slot Services Company, published prior to 2002.

Loco Loot Article written by Strictly Slots/Aristocrat Leisure Industries, PTY Ltd., published in May 2002.

Mountain Money Article written by Strictly Slots/Aristocrat Leisure Industries, PTY Ltd., published in Jun. 2002.

Penguin Pays Advertisement written by Aristocrat Incorporated, published in 1998.

Reel Magic™ Gaming Machine Description written by IGT, available in 1986.

The Basics of Winning Video Poker (Chapter VI Deuces Wild & Chapter VII Jokers Wild) written by J. Edward Allen, published in 1990.

Wild Streak Advertisement written by WMS Gaming, Inc., published in 2001.

Your Real Key to Gaming Success Advertisement (including Roll Over Beethoven and Wild Fortune) written by Olympic Video Gaming, published dated unknown.

* cited by examiner

GAMING DEVICE HAVING WILD INDICATORS

This application is a continuation of, claims priority to and the benefit of U.S. patent application Ser. No. 09/960,883, filed Sep. 21, 2001, now U.S. Pat. No. 6,866,583, the entire contents of which are incorporated herein.

CROSS REFERENCES TO RELATED APPLICATIONS

This application relates to the following, commonly owned applications: "GAMING DEVICE HAVING DUAL EVALUATION SCHEME," Ser. No. 09/687,689, "GAMING DEVICE HAVING TRANSFORMABLE WILD SYMBOLS OR CARDS WITH WILD SIGNAL INDICATORS," Ser. No. 09/957,305, now U.S. Pat. No. 6,780,109, "GAMING DEVICE HAVING WILD INDICATORS," Ser. No. 09/960,883, now U.S. Pat. No. 6,866,583, "GAMING DEVICE WITH WILD ACTIVATION SYMBOLS AND WILD TERMINATION SYMBOLS," Ser. No. 09/964,102, now U.S. Pat. No. 6,805,349; "GAMING DEVICE HAVING A VARIED WILD SYMBOL IN A BONUS GAME," Ser. No. 10/243,512, "GAMING DEVICE HAVING SYMBOLS WITH TRANSFORMATION PROBABILITIES," Ser. No. 10/255,880, now U.S. Pat. No. 6,921,335, "GAMING DEVICE HAVING RESULTANT WILD SYMBOLS," Ser. No. 10/191,154, now U.S. Pat. No. 6,905,406, "GAMING DEVICE HAVING EXTENDER SYMBOLS," Ser. No. 10/191,197, "GAMING DEVICE HAVING TRANSFORMABLE WILD SYMBOLS OR CARDS WITH WILD SIGNAL INDICATORS," Ser. No. 10/920,798, "GAMING DEVICE HAVING WILD INDICATORS," Ser. No. 10/982,096, "GAMING DEVICE WITH WILD ACTIVATION SYMBOLS AND WILD TERMINATION SYMBOLS," Ser. No. 10/966,223, and "GAMING DEVICE HAVING TRANSFORMABLE WILD SYMBOLS OR CARDS WITH WILD SIGNAL INDICATORS." Ser. No. 10/920,798,

BACKGROUND OF THE INVENTION

Gaming devices are well known. Many known gaming devices provide wild symbols or wild cards. Wild symbols provide a player with an additional opportunity to obtain winning combinations. The use of wild symbols, wild cards or wild indicators in gaming devices provide additional excitement and entertainment for players.

In a slot machine having reels, a wild symbol can enable the matching of symbols along a payline to achieve a combination. For example, in a three reel slot machine, the symbols along a payline on the first, second and third reels may be, respectively, a heart, a heart and a wild symbol. If, in the gaming scheme, the gaming device awards a player for a three heart combination, the wild symbol substitutes for a heart and provides the player with that combination.

In a video poker game, a wild symbol substitutes for a card. For example, in a five card draw poker gaming machine where the gaming device displays five cards, the cards can be a 10, Jack, Queen, King and wild card. The wild card substitutes as an Ace and provides the player with a winning combination.

Wild cards have been employed in gaming devices in other manners. For example, U.S. Pat. No. 5,431,408 discloses a gaming device having a video poker gaming scheme. A player is dealt a hand consisting of five cards. The player is also given a wild card. The wild card is separate from the dealt hand. The player can reserve the wild card for use with a subsequent hand. Thus, the player can use the wild card in a hand in which it is most advantageous to do so.

In another example, U.S. Pat. No. 6,089,977 discloses a gaming device having a roaming wild symbol. More specifically, the patent discloses a gaming device having a plurality of virtual reels which have a set of symbols. Certain symbol combinations serve as triggering events. When one of these combinations occur on the reels, a wild card symbol appears on the reels in the form of a graphical image and moves along the reels. As the wild card symbol moves from one symbol or location to adjacent symbols or locations, the symbols transform into the wild card symbol. After each move of the wild card symbol, the gaming device determines and pays the player for any winning combination which is the result of the transformation. When the wild card symbol moves to the next adjacent symbol, the symbol previously transformed reverts to its original state.

To increase player enjoyment and excitement, it is desirable to provide gaming devices having new and different wild symbol, wild indicator and wild card schemes.

SUMMARY OF THE INVENTION

The present invention provides a gaming device having at least one, and preferably, a plurality of wild indicators associated with one or more symbols on a set of reels or cards in a set of cards. The wild indicators are displayed adjacent to one, some or all of the symbols on a set of reels or cards displayed by a display device. The processor of the gaming device randomly determines if none, one or more of the wild indicators will be activated. If a wild indicator is activated, the processor transforms the symbols or cards associated with the wild indicators into wild symbols or wild cards.

In one embodiment, the gaming device includes a set of reels having a plurality of reel symbols such as hearts, cherries, numbers, and any other suitable symbols. The gaming device includes a display device for displaying a plurality of symbols and at least one payline. The reels also include one or more wild indicators adapted to be associated with one or more symbols on the reels. The wild indicators can be similar to the types of symbols described above, or can be any other type of symbol suitable for use in gaming devices. The wild indicators are preferably displayed adjacent to the symbols although the wild indicators could be displayed on the symbols or otherwise related to the symbols. In one embodiment, the wild indicators are displayed above and to the side of the symbols.

A player uses conventional control features of the gaming device to activate or spin the reels. When the reels are activated, the processor determines which, if any, wild indicators will be associated with one or more of the symbols and which, if any, wild indicators associated with the reel symbol will be activated. An association probability for each wild indicator is stored within the processor. The processor associates a wild indicator with a symbol based on the association probability for that wild indicator. In addition, an activation probability for each wild indicator is stored within the processor. The processor determines whether a wild indicator associated with a symbol will be activated based on the activation probability of that wild indicator. If a wild indicator is activated, the symbol associated with that wild indicator is. transformed into a wild symbol. The symbol then substitutes for any other symbol or a sub-group or limited number of the other symbols used by the gaming device along any payline.

The processor determines which indicator will be wild in a predetermined or random order when the reels are activated. The wild indicator can have a plurality of characteristics. For example, the indicators can have different colors, sizes, etc. The processor selects the particular characteristic of a wild indicator to determine which indicators will be activated. If more than one wild indicator displayed within the display device is activated, the processor transforms the associated symbols into wild symbols simultaneously, successively, or in any combination thereof.

For example, within a display device a first reel has a blue cherry wild indicator and a second reel has a blue diamond wild indicator. If the processor determines that all blue indicators are activated, then the processor transforms the symbols associated with those wild indicators into wild symbols either simultaneously, successively, or in any combination thereof. In the same example, if a red cherry wild indicator was displayed with a symbol, and the processor determined that all cherry indicators were activated, then the processor transforms the symbols associated with those wild indicators into wild symbols either simultaneously, successively, or in any combination thereof.

In another embodiment, the display device displays at least one wild indicator on a card in a video poker game. Prior to dealing the cards, the processor determines if one or more wild indicators will be associated with the card and which wild indicators, if any, to activate. The card having the wild indicator that is activated transforms into a wild card.

If more than one card has a wild indicator which is activated, the processor can transform the cards into wild cards simultaneously, successively, or in any combination thereof.

It is therefore an advantage of the present invention to provide a gaming device having wild indicators associated with symbols or cards wherein the wild indicators are activated to provide wild symbols or wild cards.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
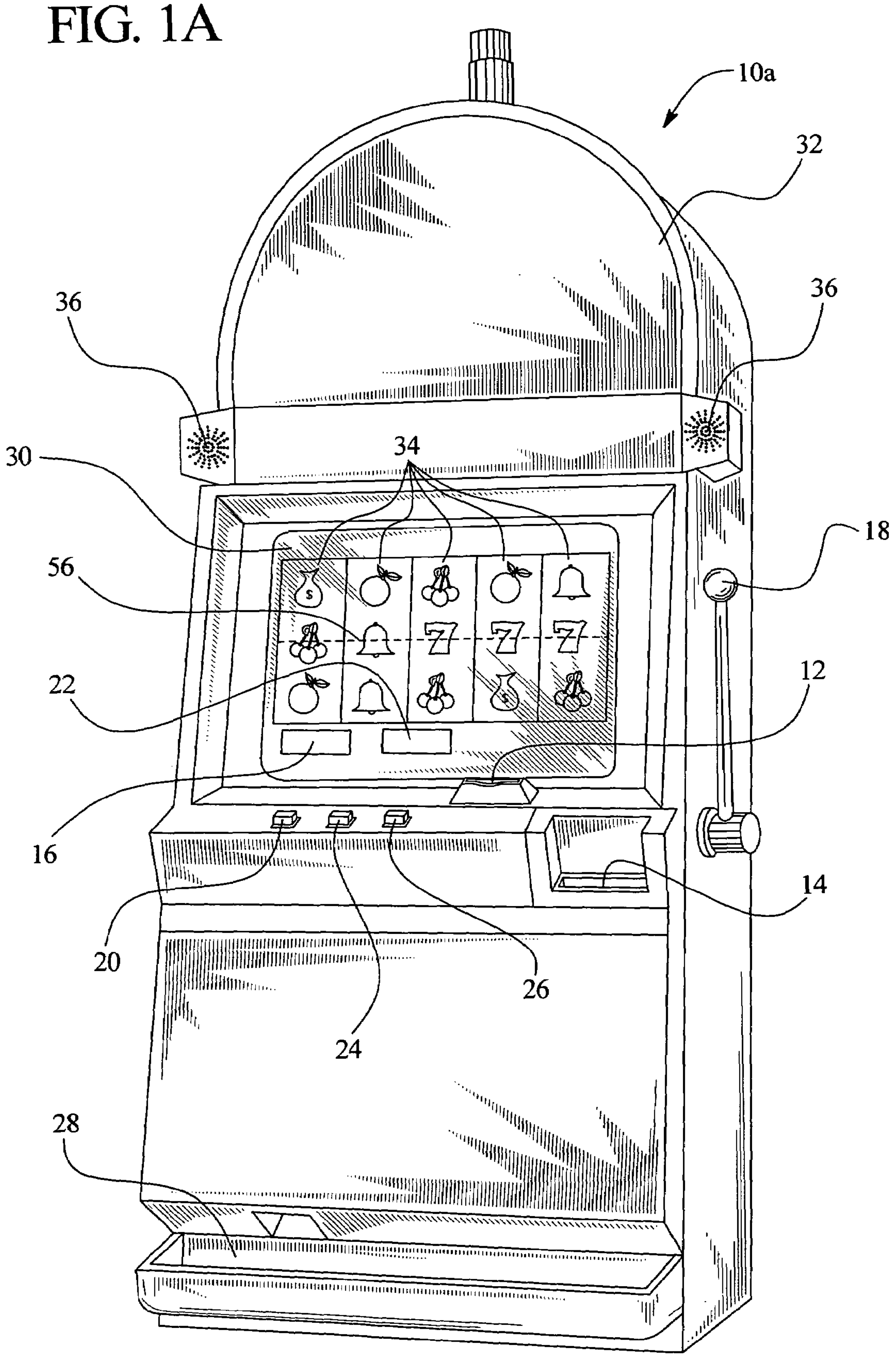
FIGS. 1A and 1B are perspective views of alternate embodiments of the gaming device of the present invention.
Figure 1B:
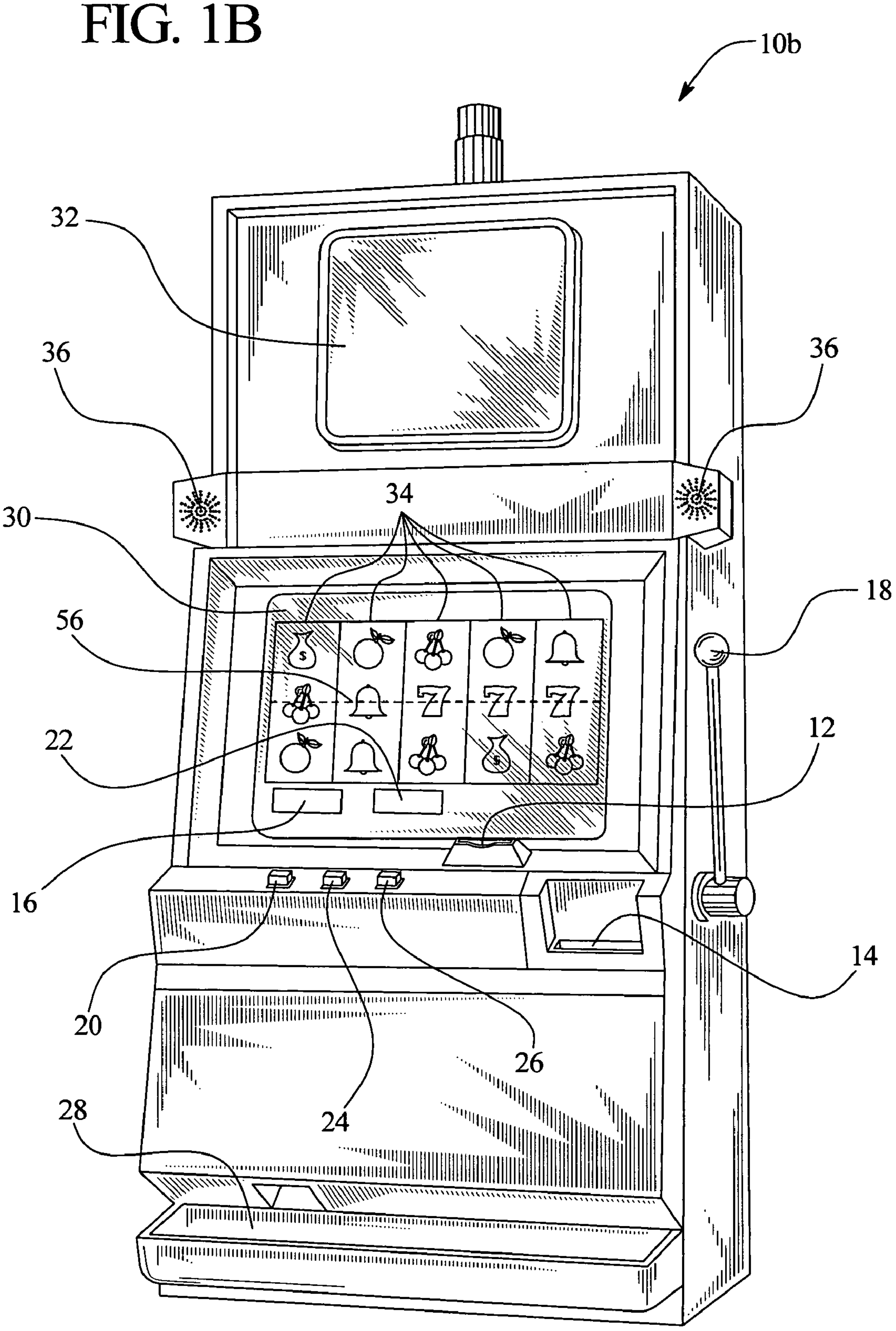

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game, described below, being a stand alone game or a bonus or secondary game that coordinates with a base game. When the game of the present invention is a bonus game, gaming device 10 can be a slot machine having the controls, displays and features of a conventional slot machine, or another game such as a video card game such as poker. The player can operate the gaming device while standing or sitting. Gaming device 10 also includes being a pub-style or table-top game (not shown), which a player operates while sitting.

The gaming device 10 may include any bonus triggering events, bonus games as well as any progressive game coordinating with the base game. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine primary game embodiment, the display device includes displaying one or more cards.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
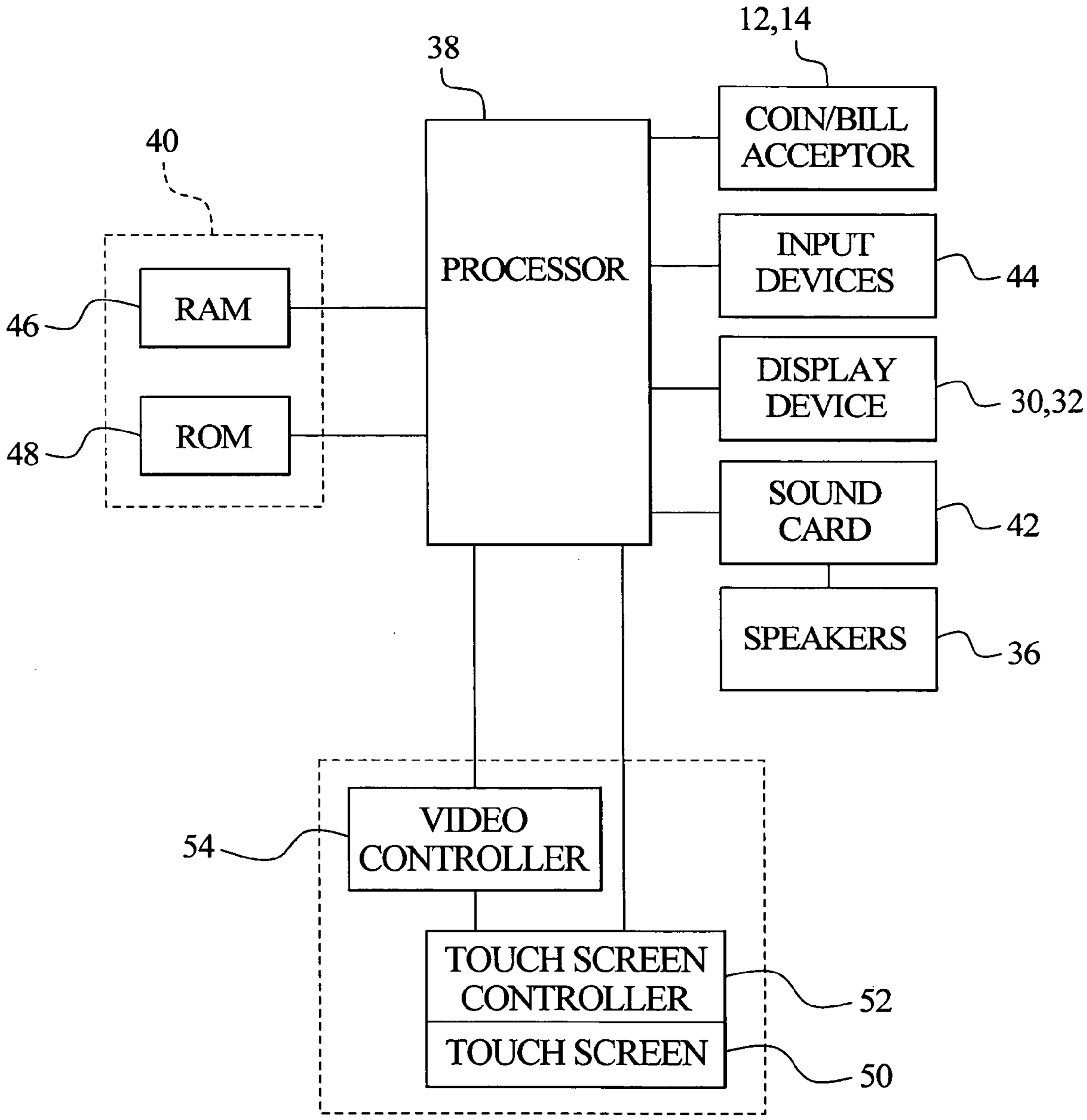
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

Wild Indicators

Figure 3:
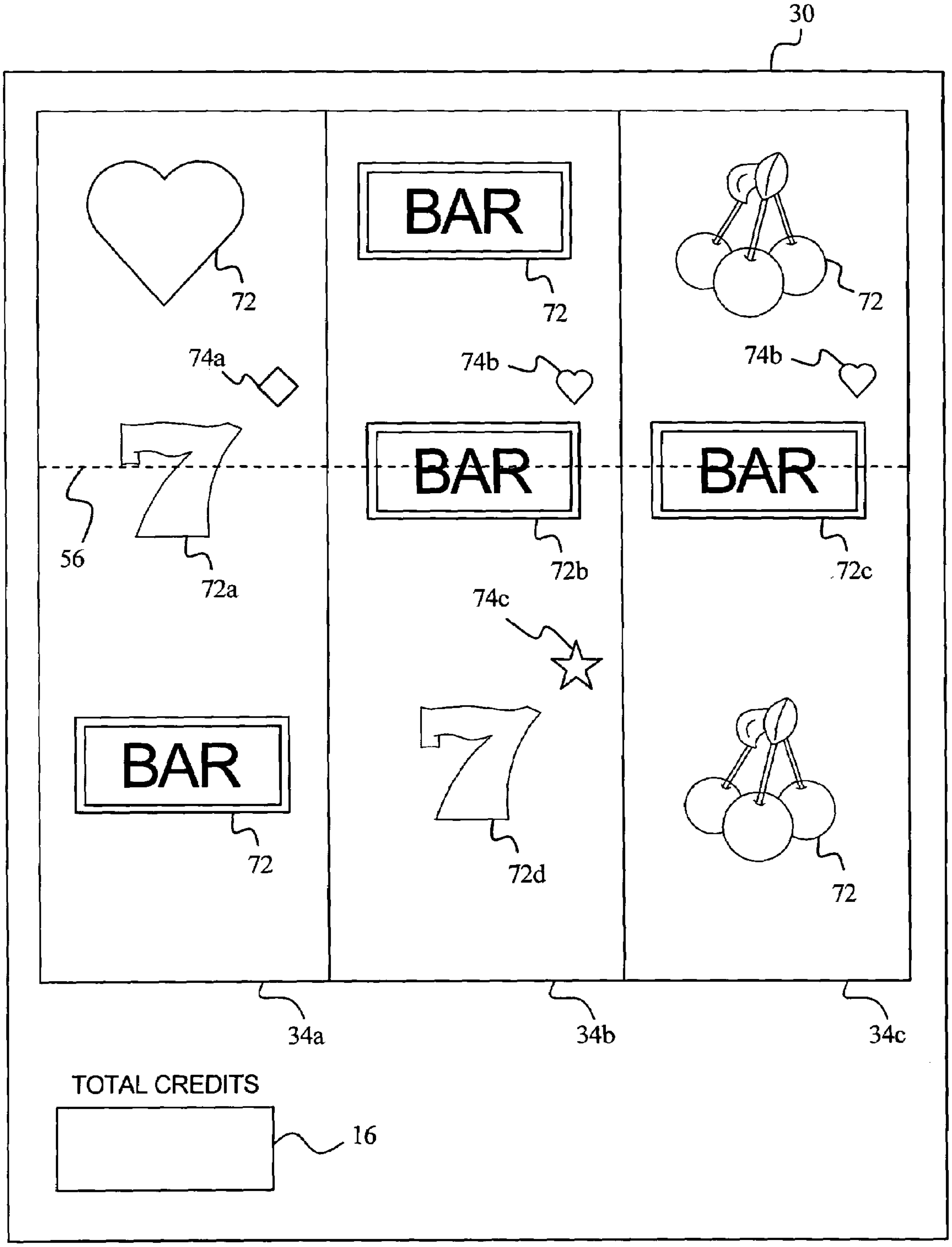
FIG. 3 is a front elevation view of a display device displaying a set of reels having symbols and wild indicators.

In one embodiment of the present invention which may be implemented as a primary game or a bonus or secondary game in a gaming device, a display device displays three reels 34*a*, 34*b* and 34*c*, as illustrated in FIG. 3. The reels have symbols 72. The symbols can be any symbols such as cherries, hearts, diamonds, numbers, or other symbols suitable for use in gaming devices. The reels also include one or more wild indicators 74*a*, 74*b* and 74*c*. The wild indicators may be similar to the types of symbols mentioned above. In the primary embodiment, the processor randomly determines which, if any, wild indicators will be associated with which symbol each time the game is activated. In an alternative embodiment, one or more wild indicators are permanently associated with one or more symbols.

The wild indicators are positioned adjacent to the symbols. In one embodiment, the indicators are positioned above and to the side of the symbols, as illustrated in FIG. 3. It should be appreciated that the wild indicators could be associated with one symbol on one reel, one symbol on each of a plurality of reels, one symbol on each reel, a plurality of symbols on one reel, a plurality of symbols on each of a plurality of reels, and a plurality of symbols on a plurality of reels. It should be appreciated that the wild indicators could take other forms such as being indicated to the player by different lighting patterns.

After a player makes a wager, the player uses the control features of the gaming device to activate or spin the reels. When the reels are activated, the processor determines which, if any, wild indicators will be associated with the symbols and which, if any, of such wild indicators within the display device will be activated. The processor can choose which wild indicators, if any, are to be activated in a random or predetermined manner. If the wild indicators are chosen in a random manner, an association probability for each wild indicator is stored within the processor. The processor then associates a wild indicator with a symbol based on the association probability for that wild indicator. It should be appreciated that the association probability for one wild indicator may be higher than the association probability for another wild indicator. The processor may also choose which wild indicators are activated in a random manner.

Accordingly, an activation probability for each wild indicator is stored within the processor. The processor then determines whether a wild indicator associated with a symbol will be activated based on the activation probability of that wild indicator. It should be appreciated that certain wild indicators may have a greater probability of being activated than other wild indicators.

In one example, illustrated in FIG. 3, the first reel 34*a* includes a "7" symbol 72*a* and a wild indicator 74*a* in the form of a diamond along the middle payline 56. The second reel 34*b* includes a BAR symbol 72*b* and a different wild indicator 74*b* in the form of a heart. The third reel 34*c* includes a BAR symbol 72*c* and a second heart wild indicator 74*b*.

Figure 4:
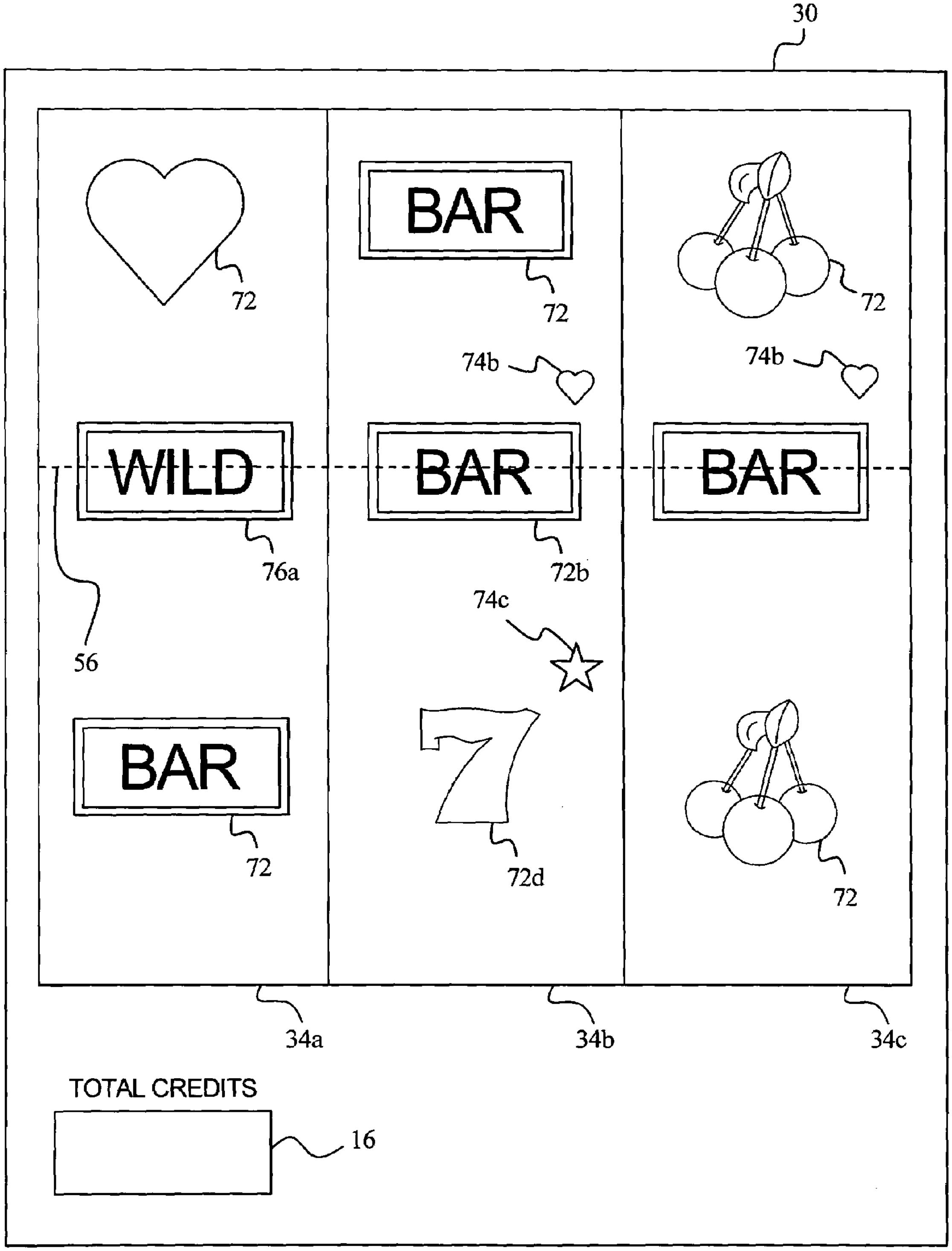
FIG. 4 is a front elevation view of a display device displaying a set of reels in which certain symbols are transformed into wild symbols.

If the processor determines that diamond wild indicators 74*a* are to be activated, the processor transforms the symbol(s) associated with the diamond wild indicator into a wild symbol, as illustrated in FIG. 4. The "7" symbol 72*a* becomes a wild symbol 76*a* and substitutes as a BAR symbol, giving the player three BAR symbols along a payline and a win (i.e., in conventional slot machines, the combination of three BARS is a winning outcome). It should be appreciated that the processor can transform symbols into wild symbols for winning combinations along any active payline used by the gaming device.

Figure 5:
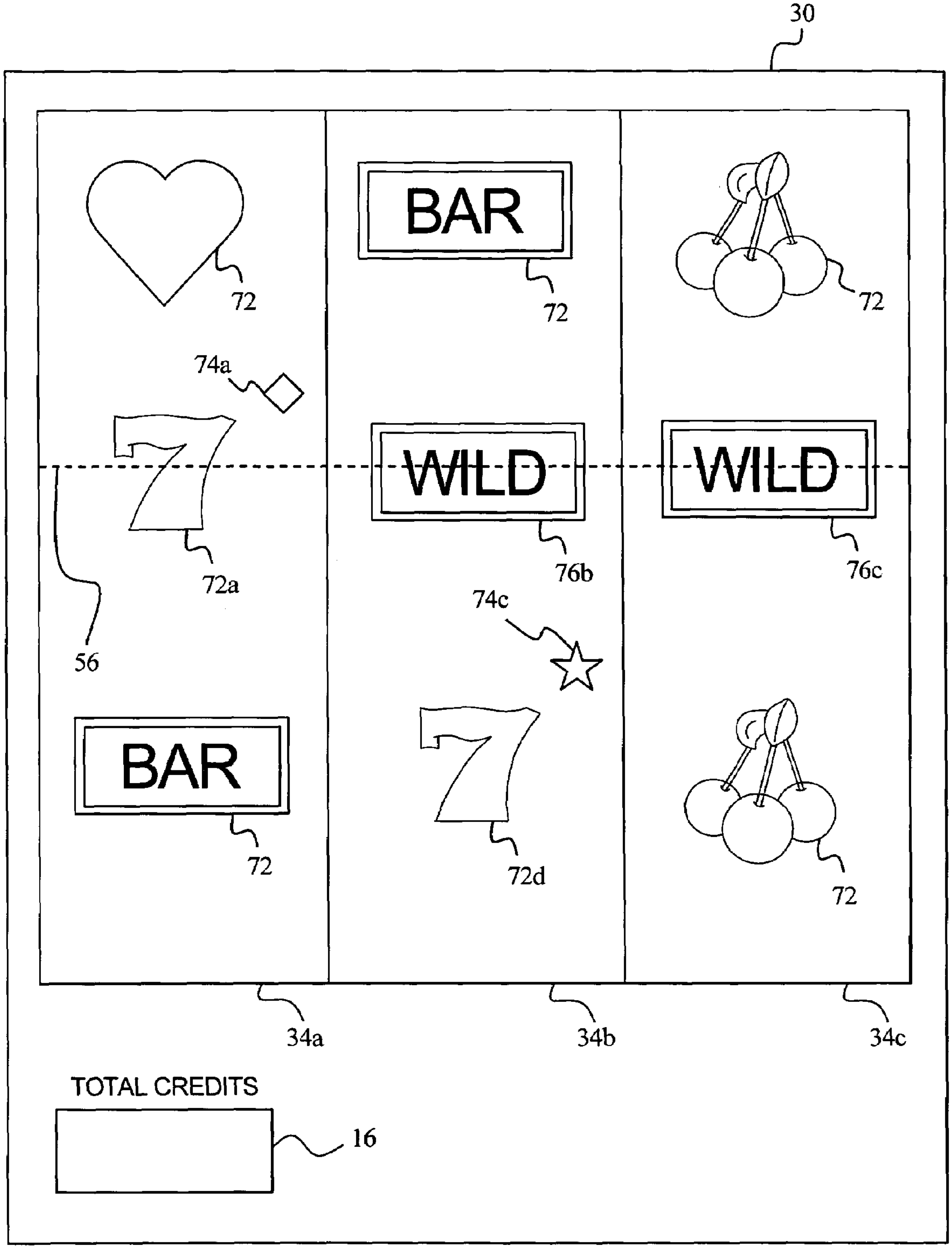
FIG. 5 is a front elevation view of a display device displaying a set of reels in which certain symbols are transformed into wild symbols.

If the processor determines that heart wild indicators 74*b* are to be activated, the processor transforms the symbols 72*b* and 72*c* associated with the heart wild indicators on the second and third reels into wild symbols 76*b* and 76*c*. The symbols can be transformed simultaneously or successively. If the symbols are transformed simultaneously, the BAR symbols become wild and substitute as "7" symbols, giving the player three "7s" and a win, as illustrated in FIG. 5.

Figure 6A:
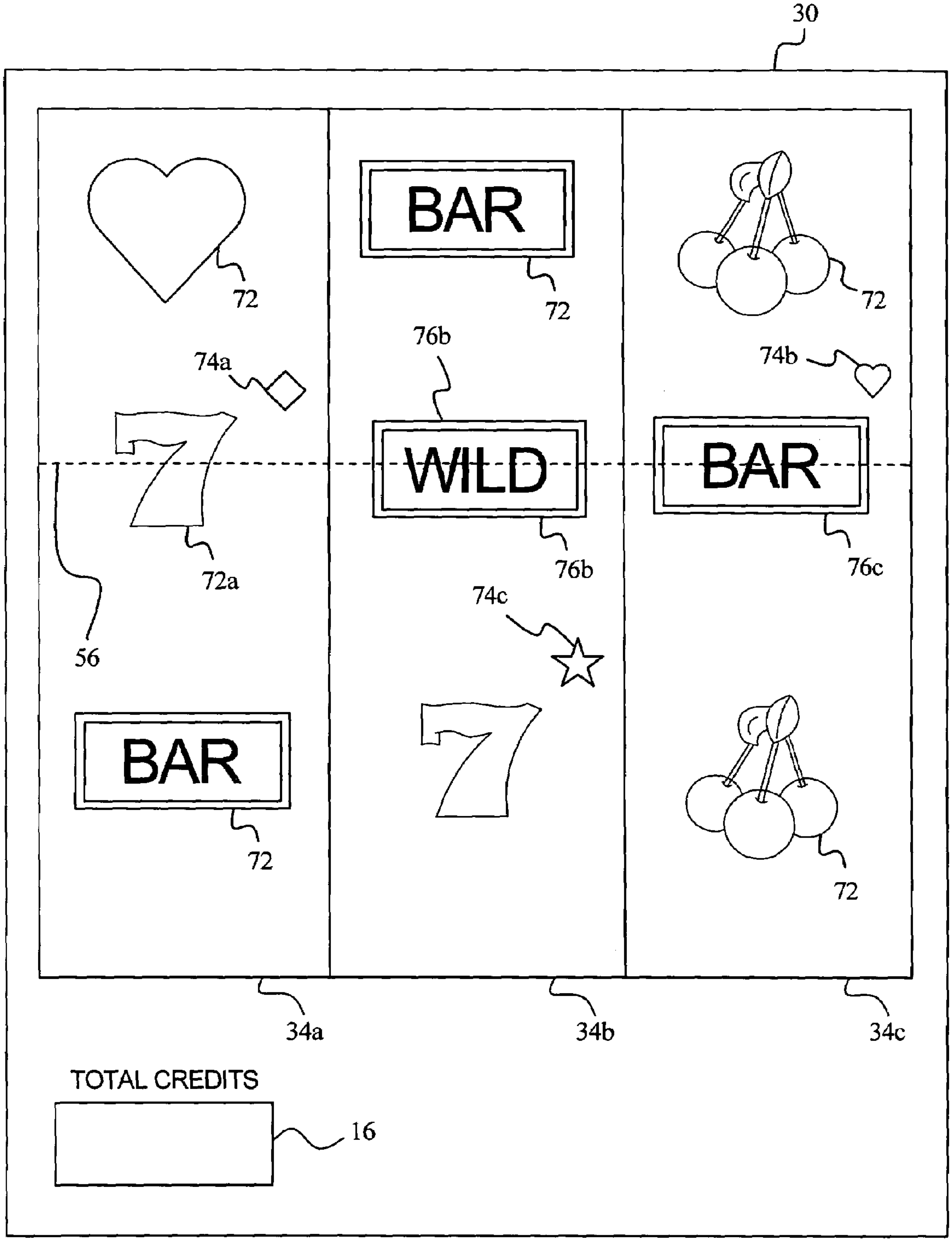
FIGS. 6A and 6B are front elevation views of a display device displaying a set of reels in which certain symbols are transformed into wild symbols successively.
Figure 6B:
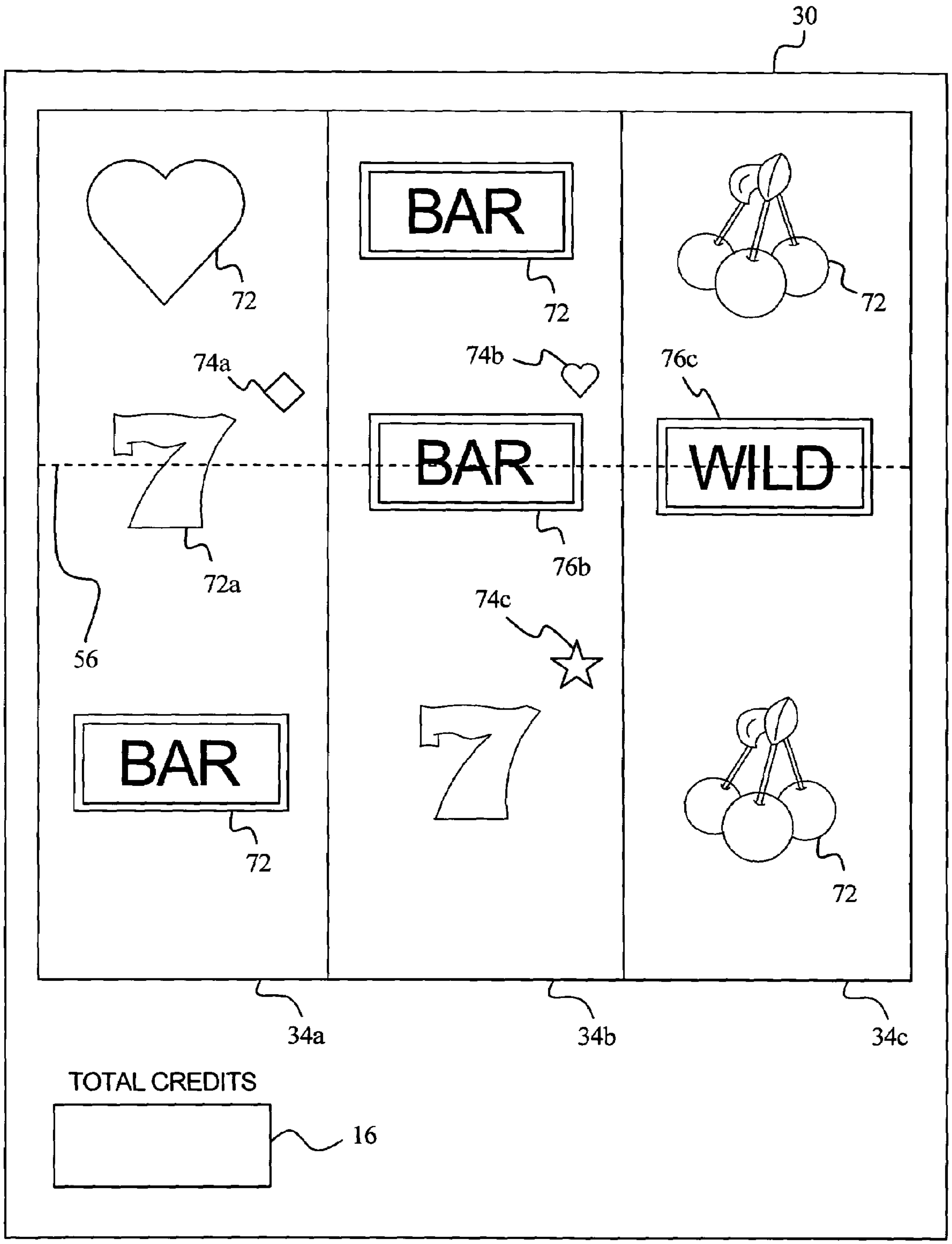

In an embodiment in which the processor transforms the symbols successively, a first symbol transforms into a wild symbol. The gaming device awards the player for any winning combinations in connection with the first symbol. That symbol then transforms into its original state before or when a second symbol transforms into a wild symbol. In the above example, if the symbols are transformed successively, the BAR symbol 72*b* on the second reel 34*b* becomes a wild symbol 76*b* and can substitute for the "7" symbol or can remain unchanged, as illustrated in FIG. 6A. This can also occur for the BAR symbol 72*c* on the third reel 34*c*, as illustrated in FIG. 6B. It should be appreciated that the symbols can transform in any order when transforming successively.

The processor may signal to the player that a symbol has transformed into a wild symbol in any suitable manner. In one embodiment, the symbol changes into a symbol displaying a word such as "WILD" as illustrated and described above. In another embodiment, the speakers emit a sound or message indicating the transformation of the symbol. In an embodiment in which the reels are mechanical, backlighting or other lighting can be used to indicate activation of wild indicators and/or the transformation of symbols into wild symbols. Moreover, any type of audio message or visual display is contemplated for indicating the transformation of the symbols. The processor then awards the player for any winning combinations along any paylines. The player's credit amount is shown in a credit display 16.

Figure 7:
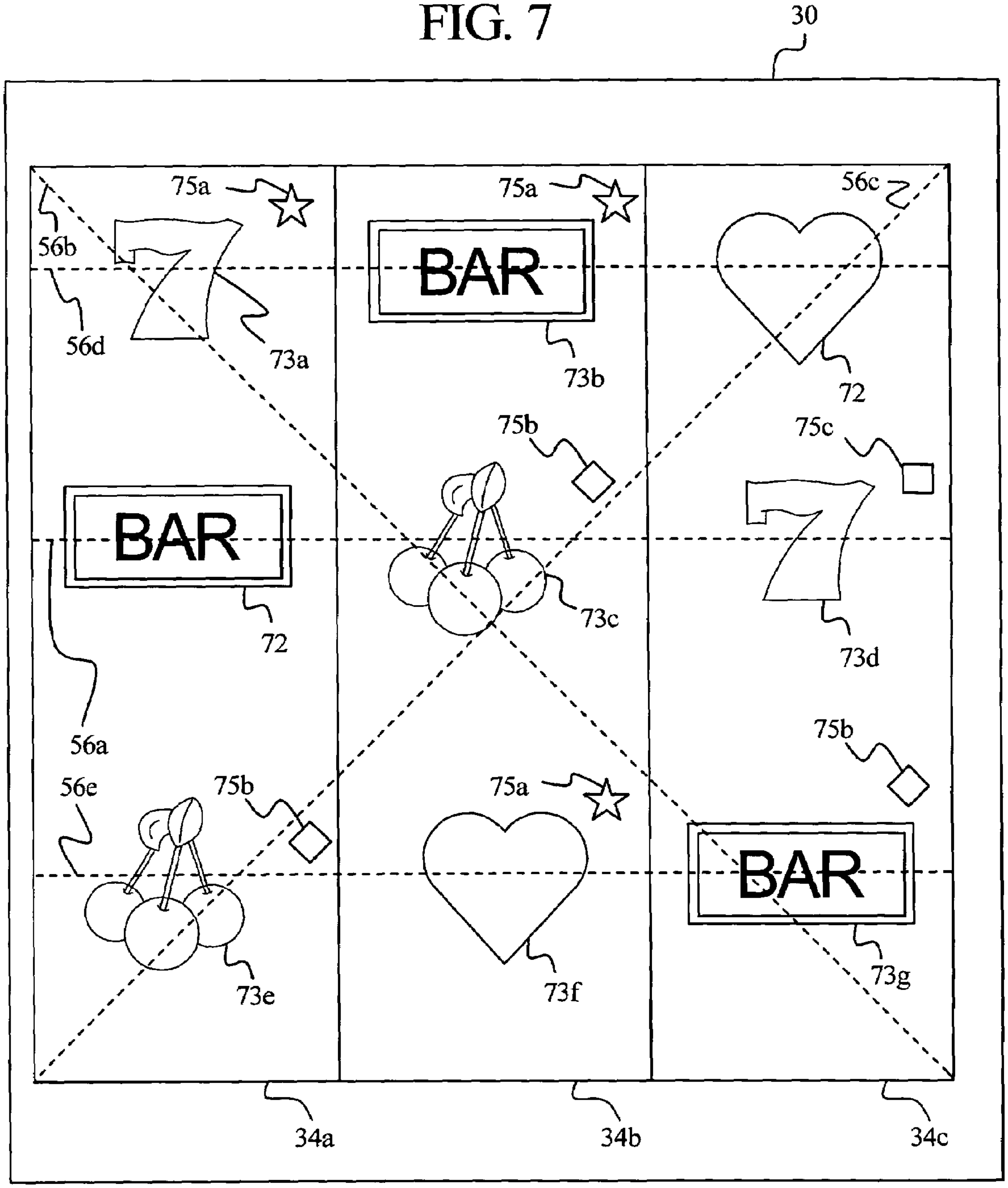
FIG. 7 is a front elevation view of a display device displaying a set of reels having symbols and wild indicators.
Figure 8:
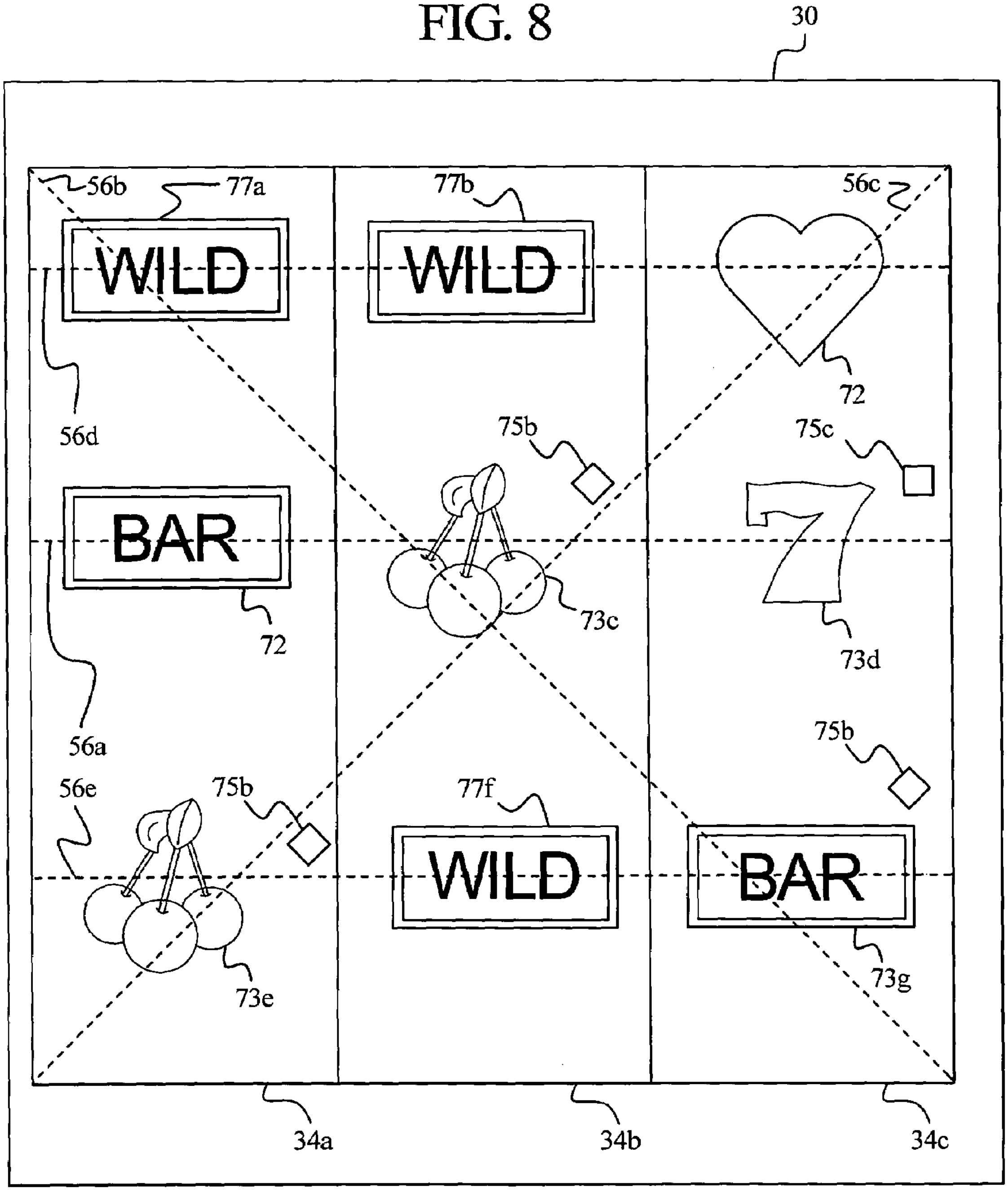
FIG. 8 is a front elevation view of a display device displaying a set of reels in which certain symbols are transformed into wild symbols.

In one embodiment, the processor activates a plurality of wild indicator symbols along multiple paylines. In one example, illustrated in FIG. 7, a gaming device has a set of reels 34*a*, 34*b* and 34*c*, having a plurality of symbols displayed within a display device. The reels have a plurality of wild indicators 75*a*, 75*b* and 75*c* associated with a plurality of the symbols. The processor activates all wild indicators 75*a* in the form of a star. The processor then transforms all symbols associated with the star wild indicators into wild symbols 77*a*, 77*b* and 77*f*. The symbols transform simultaneously, as illustrated in FIG. 8. The player has three hearts along the top payline displayed within the display device. Along the bottom payline 56*e*, the player receives two cherries and two BARs, and along the payline 56*b*, the player receives two cherries and two "7s". Thus, the player receives no additional award (except if one or more cherries provide an award as in many conventional slot machines).

Figure 9:
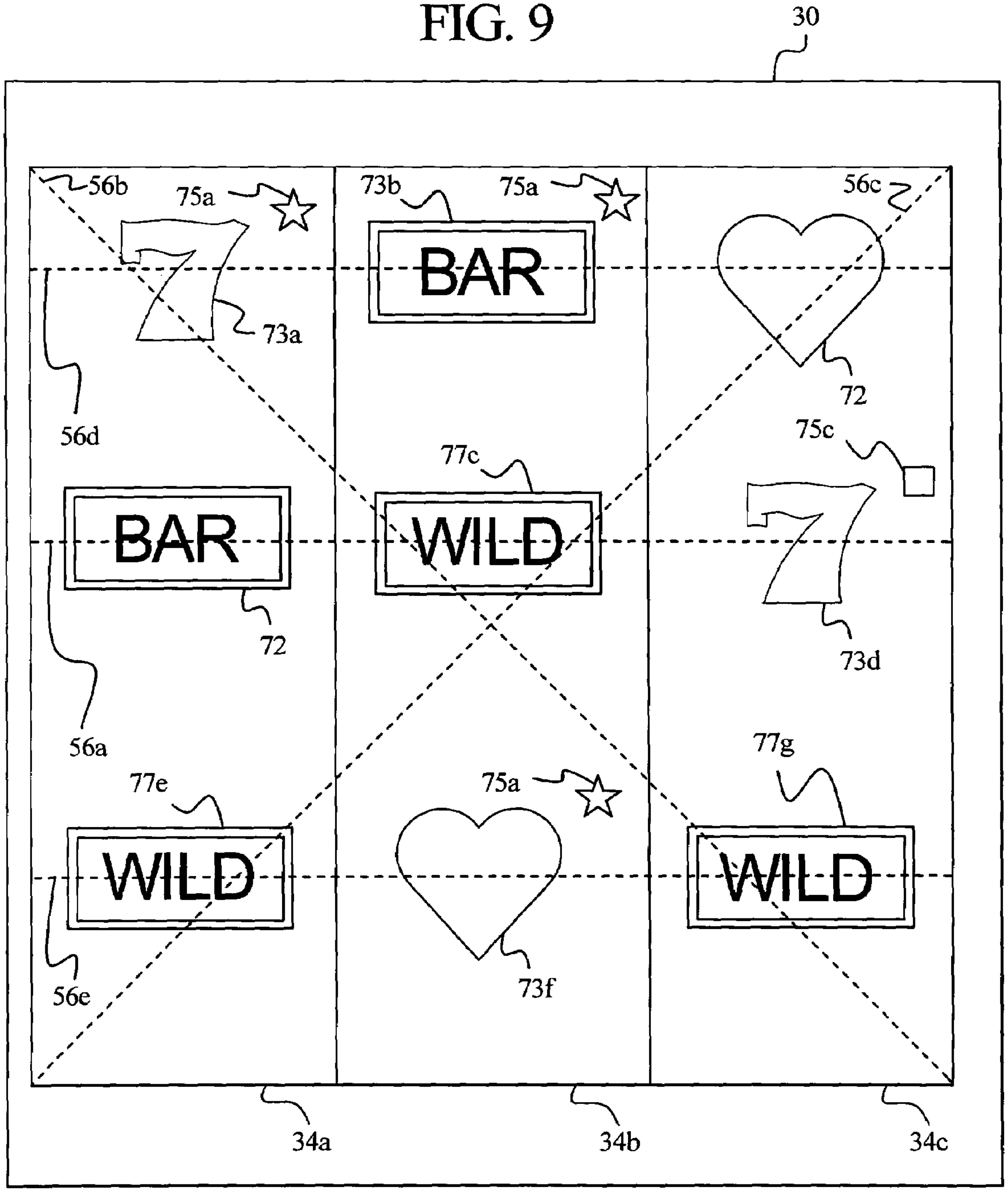
FIG. 9 is a front elevation view of a display device displaying a set of reels in which certain symbols are transformed into wild symbols.

In another example, the processor activates all diamond wild indicators 75*b*. The processor transforms those symbols associated with the diamond wild indicators into wild symbols 77*c*, 77*e* and 77*g* simultaneously as illustrated in FIG. 9. The player receives three "7" symbols along a diagonal payline 56*b*. In addition, the player receives three heart symbols along the diagonal payline 56*c*.

Figure 10A:
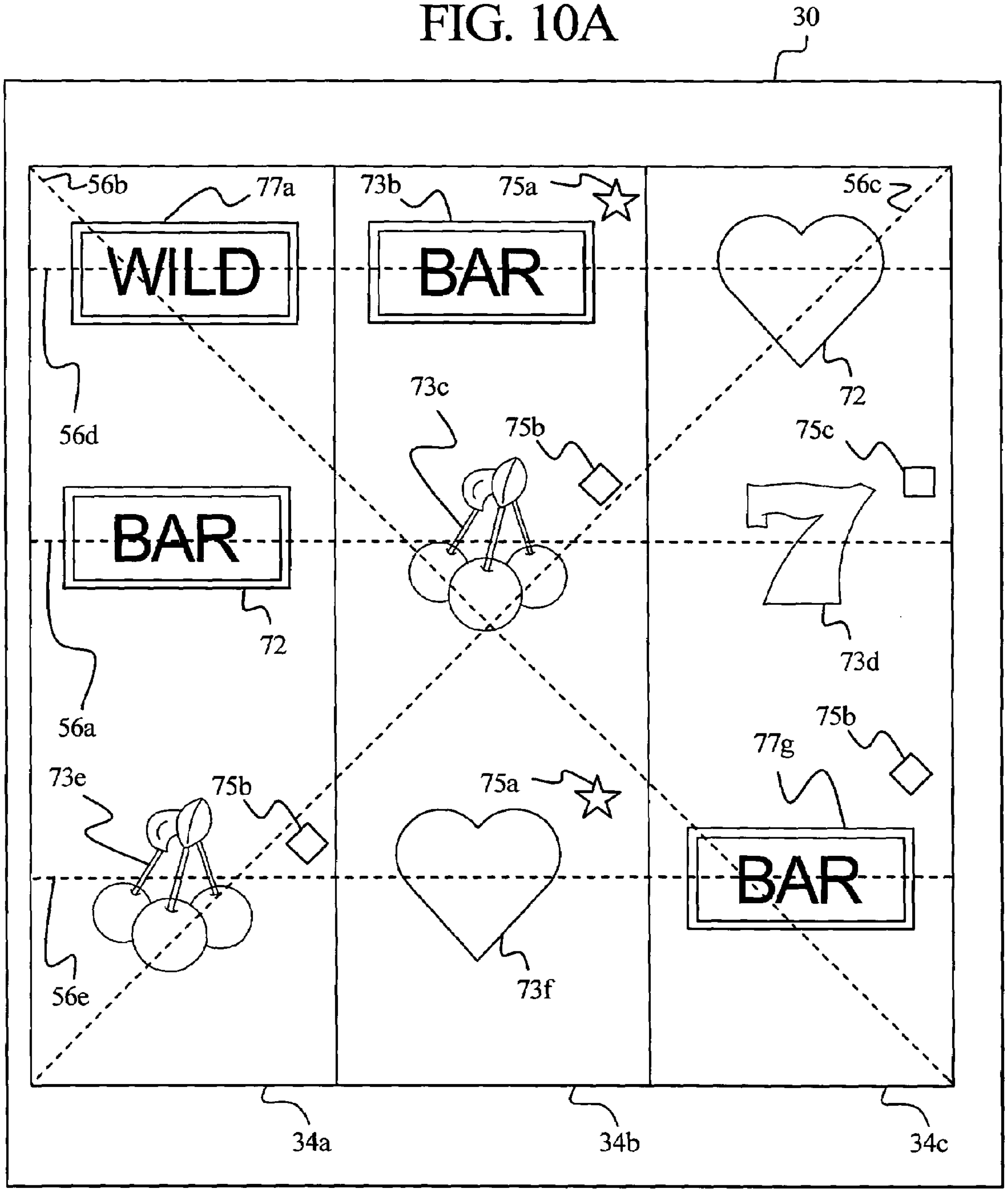
FIGS. 10A, 10B and 10C are front elevation views of a display device displaying a set of reels in which certain symbols are transformed into wild symbols successively.
Figure 10B:
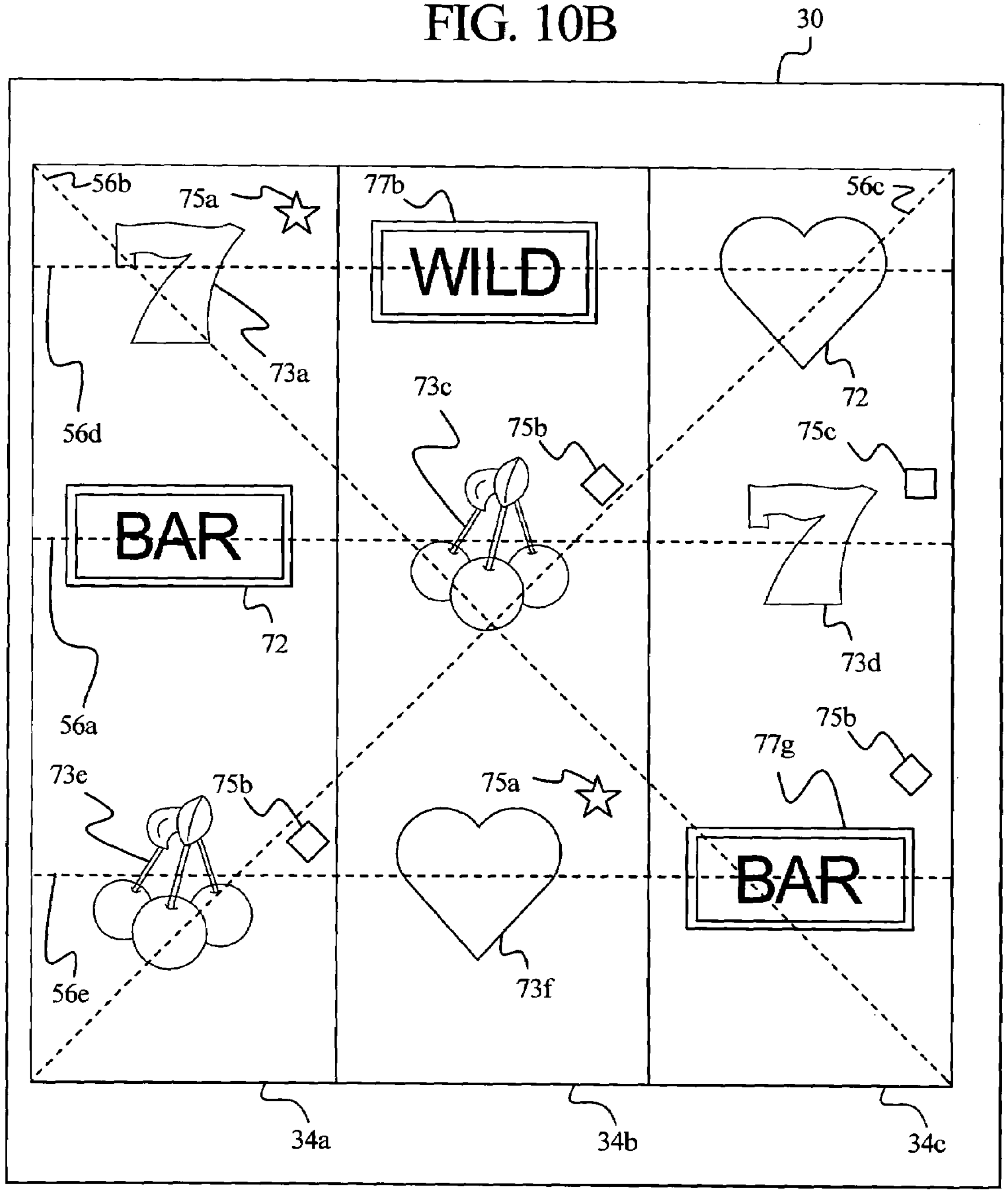
Figure 10C:
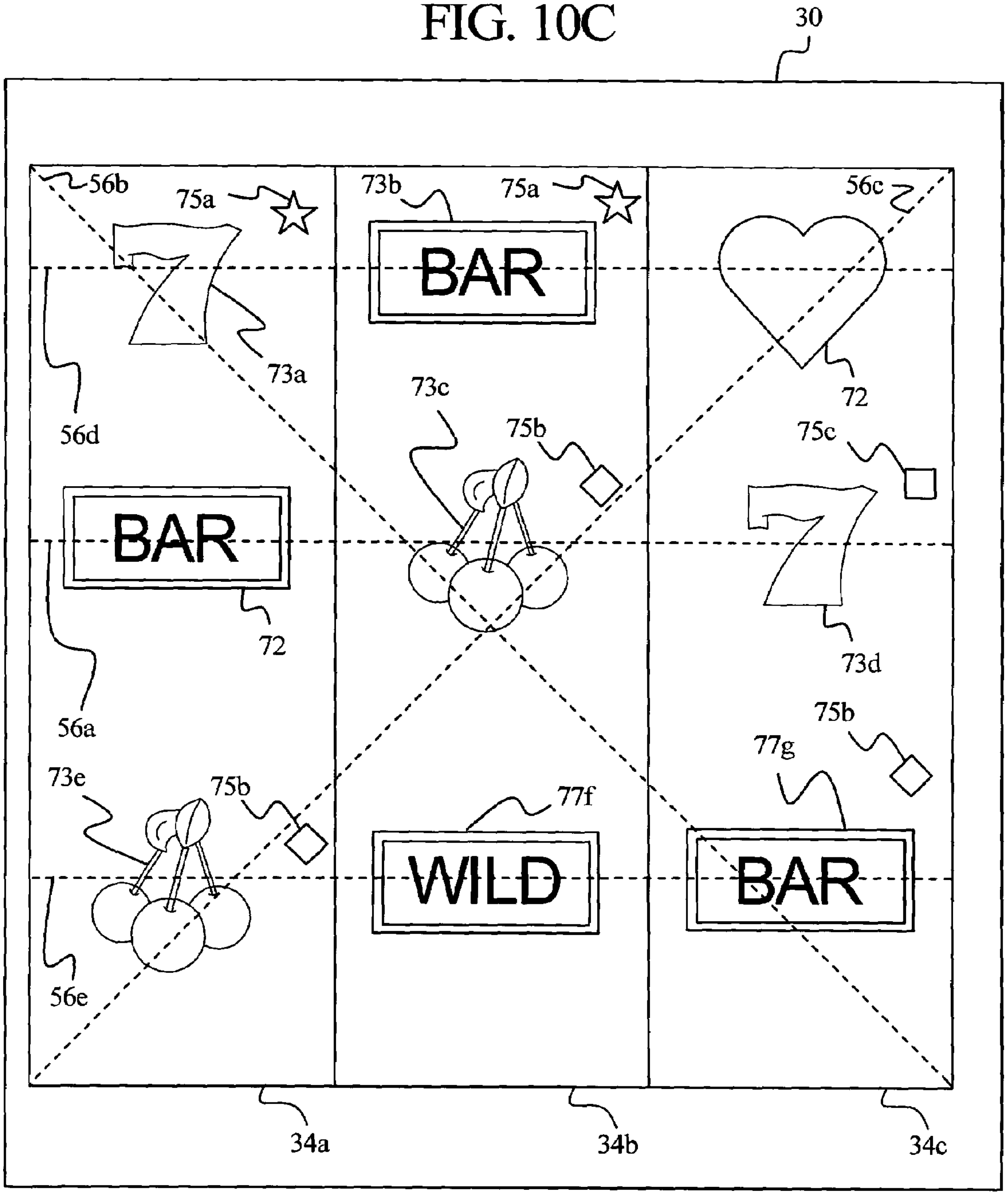

In another example, the processor activates the star wild indicators 75*a* and successively transforms all symbols associated with star wild indicators into wild symbols. The "7" symbol 73*a* on the first reel 34*a* becomes a wild symbol 77*a*, as illustrated in FIG. 10A. Next, the BAR symbol 73*b* on the second reel 34*b* becomes a wild symbol 77*b*, as illustrated in FIG. 10B. The heart symbol 73*f* on the second reel becomes a wild symbol 77*f*, as illustrated in FIG. 10C. The processor then awards the player for any winning combinations along any of the paylines for each transformation.

Figure 11A:
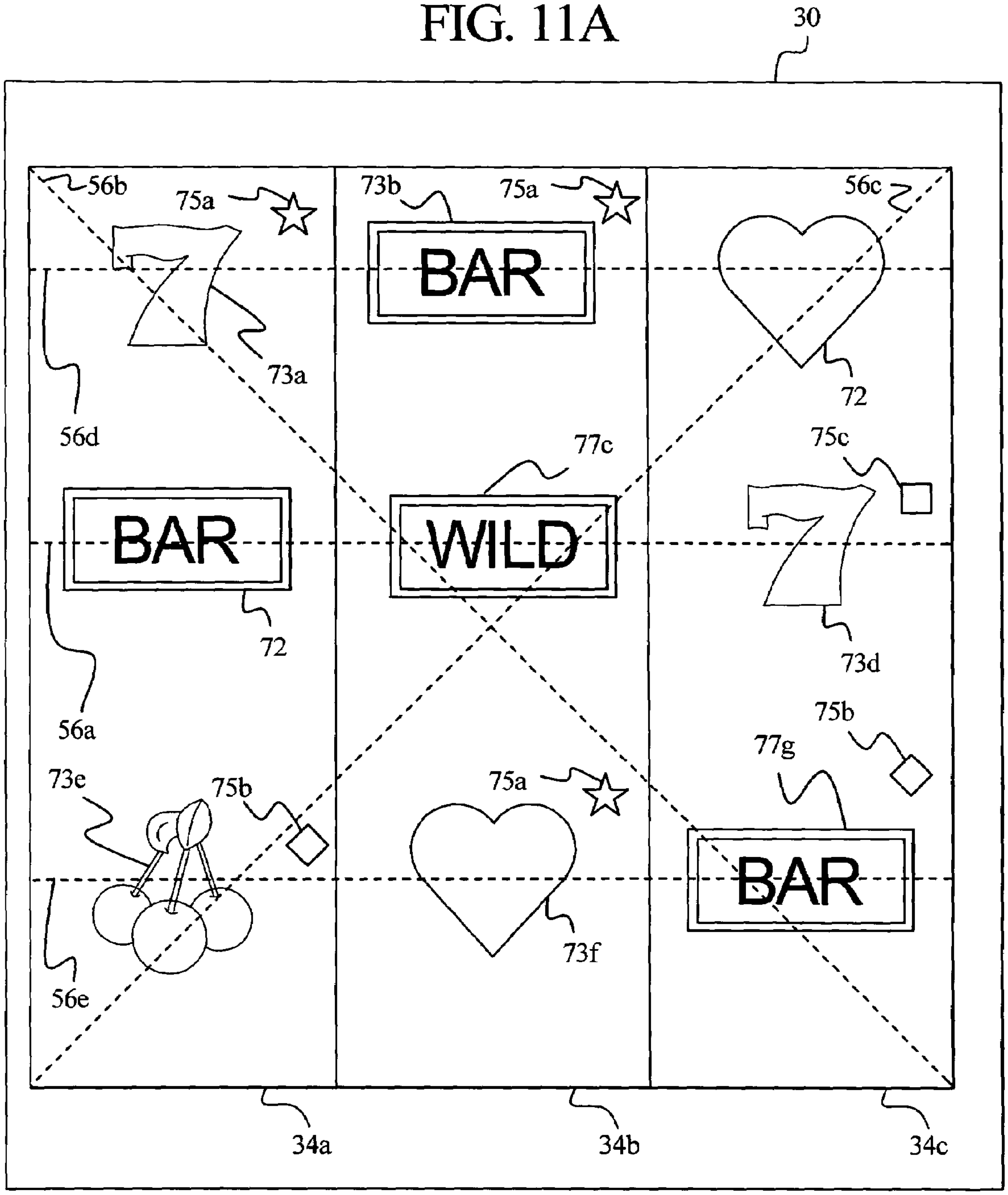
FIGS. 11A, 11B and 11C are front elevation views of a display device displaying a set of reels in which certain symbols are transformed into wild symbols successively.
Figure 11B:
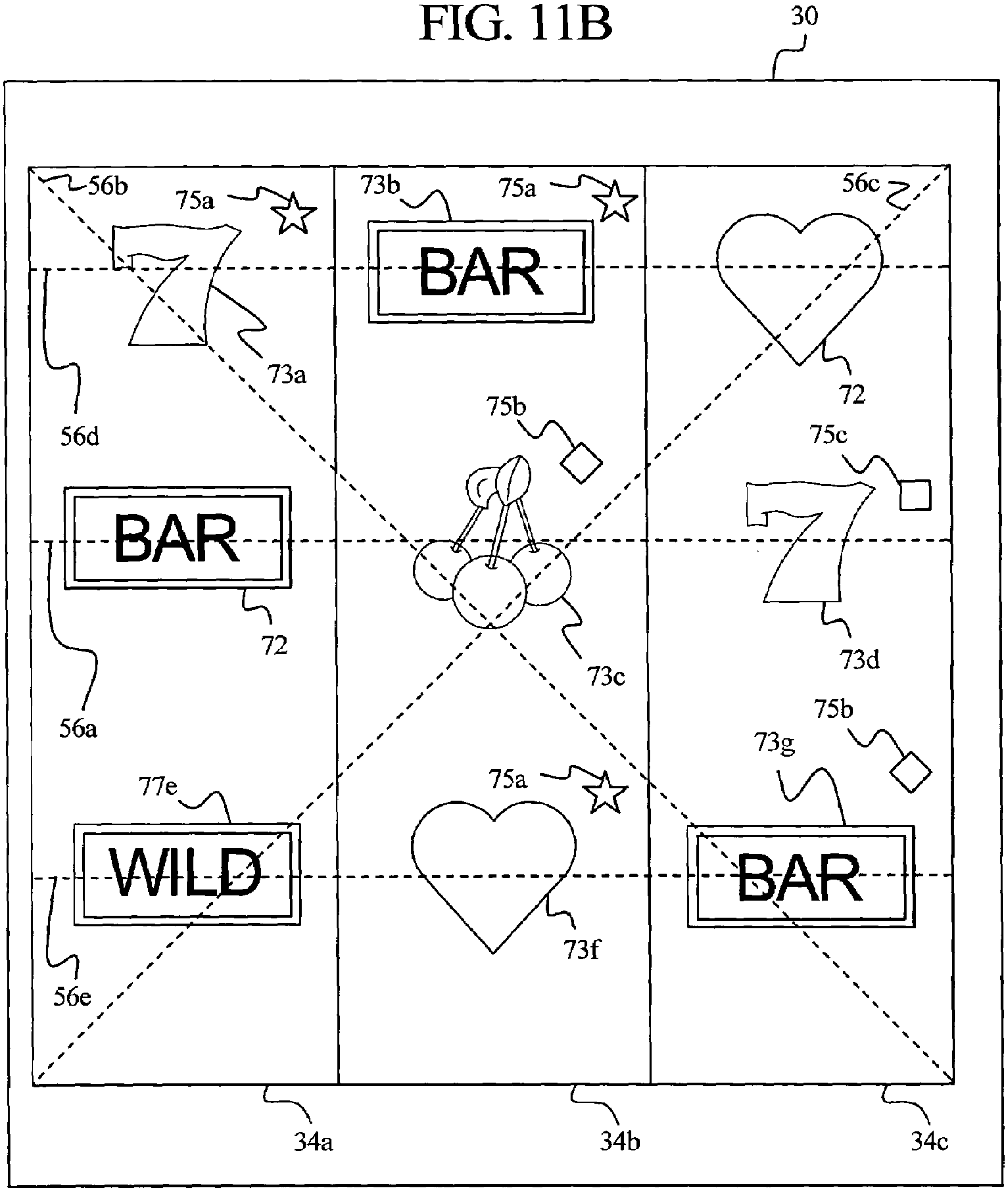
Figure 11C:
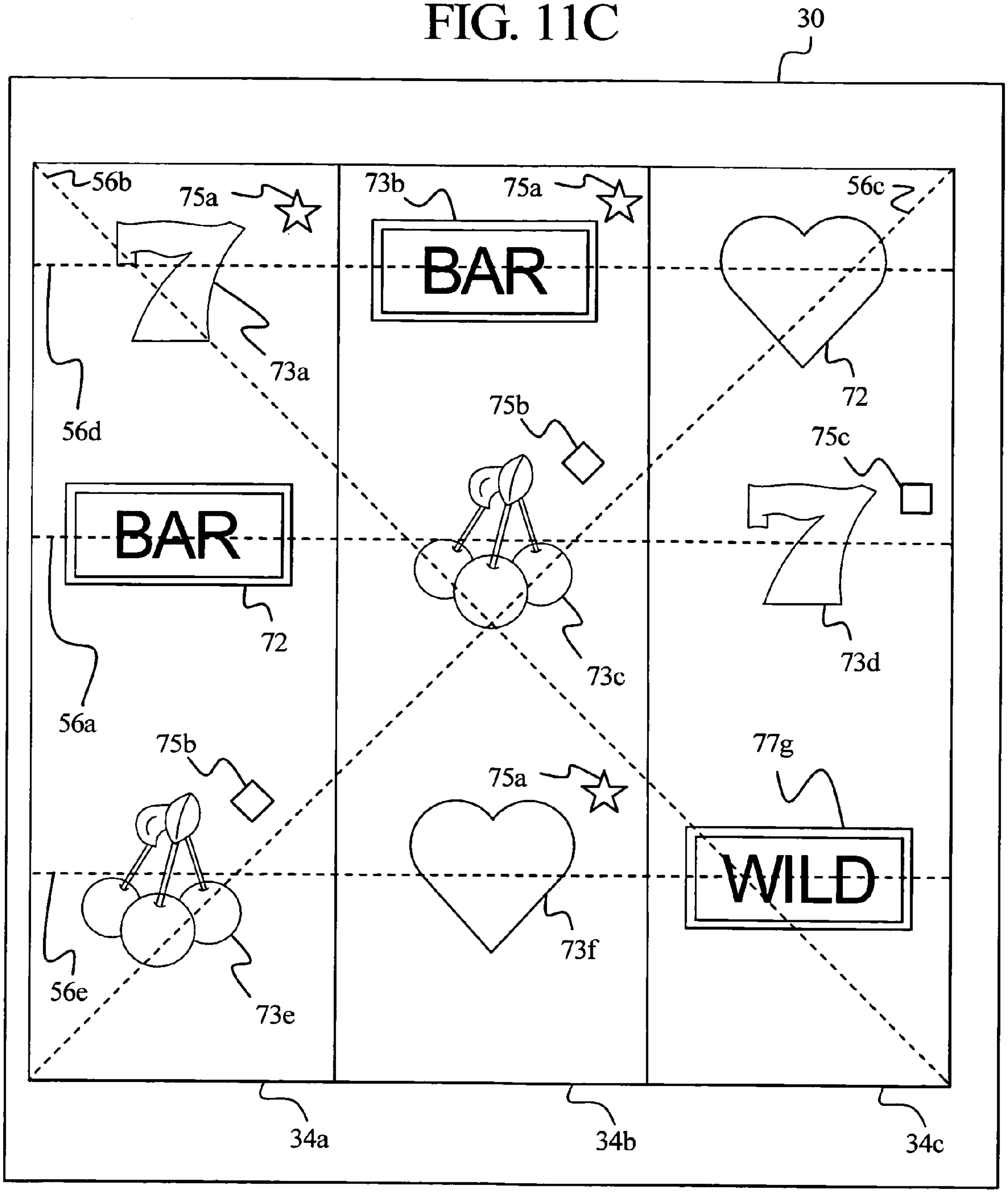

In another example, the processor activates the diamond wild indicators 75*b* and transforms all symbols associated with diamond wild indicators into wild symbols successively. As a result, the cherry symbol 73*c* on the second reel 34*b* transforms into a wild symbol 77*c* as illustrated in FIG. 11A. The cherry symbol 73*e* on the first reel 34*a* transforms into a wild symbol 77*e* as illustrated in FIG. 11B. The BAR symbol 73*g* on the third reel 34*c* then transforms into a wild symbol 77*g* as illustrated in FIG. 11C.

Figure 12:
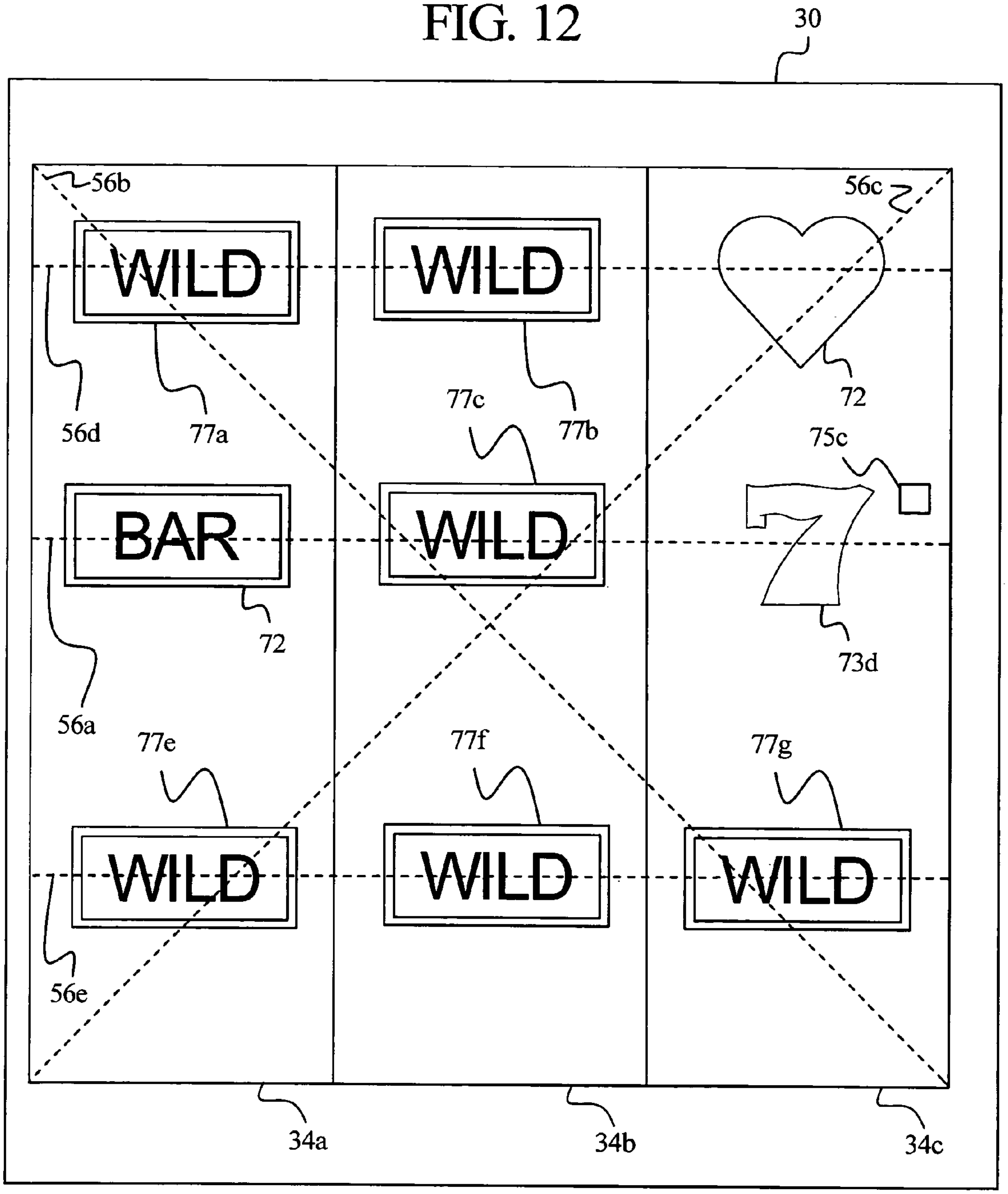
FIG. 12 is a front elevation view of a display device displaying a set of reels in which certain symbols are transformed into wild symbols.

In another embodiment, the processor activates a plurality of different wild indicators during the same game. For example, the processor activates both star wild indicators 75*a* and diamond wild indicators 75*b*. The processor then transforms symbols associated with these wild indicators into wild symbols 77*a*, 77*b*, 77*c*, 77*e*, 77*f* and 77*g*, as illustrated in FIG. 12. As a result, the player receives three heart symbols along the top payline 56*d*. The player also receives three wild symbols along the bottom payline 56*e*. The player receives three wild symbols along the diagonal payline 56*b* extending from the top of the first reel to the bottom of the third reel. The player also receives three heart symbols along the opposite diagonal payline 56*c*.

As indicated above, it should further be appreciated that the wild indicators could have multiple characteristics which are activated by the processor. For example, wild indicators could include a blue diamond, a red diamond, a blue heart, and a red heart. The processor could thus activate the red wild indicators, the blue wild indicators, the diamonds, the hearts, or any combination thereof.

In another embodiment of the present invention, the wild indicator is associated with one or more cards in a video poker game. The processor may determine that certain cards have a wild indicator in the form of a cherry, heart, number or other symbol suitable for use in a gaming device. The wild indicator can appear on any portion of a card or be otherwise associated with the card. In the illustrated embodiment of FIG. 13, the wild indicator appears in an upper corner of the card. The processor, prior to dealing the cards, determines which, if any, wild indicators will be associated with the cards and which, if any, of such wild indicators will be activated. The processor accordingly transforms the appropriate cards into wild cards. The association or activation may be determined randomly. As a result, the processor may include an association probability and an activation probability for each wild indicator which is utilized in a manner similar to that described above.

Figure 13:
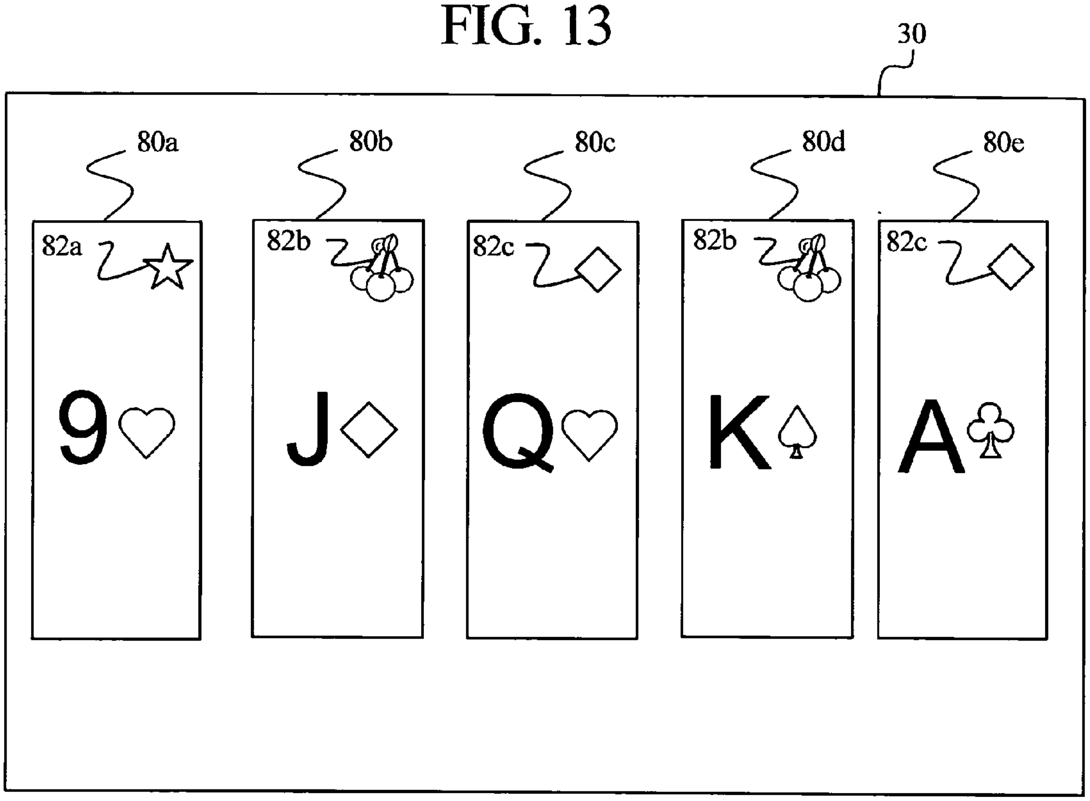
FIG. 13 is a front elevation view of a display device displaying a set of cards.
Figure 14:
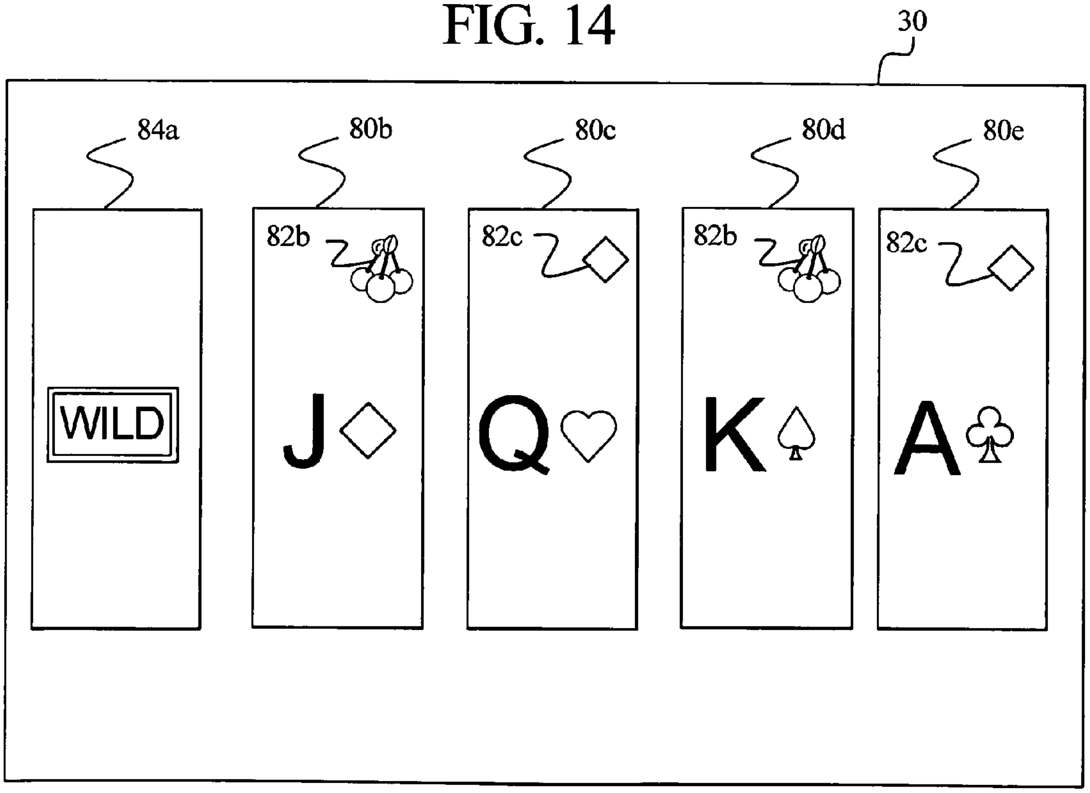
FIG. 14 is a front elevation view of a display device in which a card is transformed into a wild card.

For example, a set of cards 80*a* through 80*e* are displayed in FIG. 13. Prior to dealing the cards, the processor determines that star wild indicators 82*a* will be activated. As a result, when the cards are dealt, the star wild indicator is activated and the first card 80*a* is transformed into a wild card 84*a*, as illustrated in FIG. 14. The player then obtains a winning combination.

The processor provides a signal that a card is a wild card in several ways. In one embodiment, the card displays the word "WILD." In another embodiment, the card flashes. In yet another embodiment, the speakers can emit a sound or message indicating the transformation of the card. Any other suitable indication method may be implemented in conjunction with the present invention.

Figure 15:
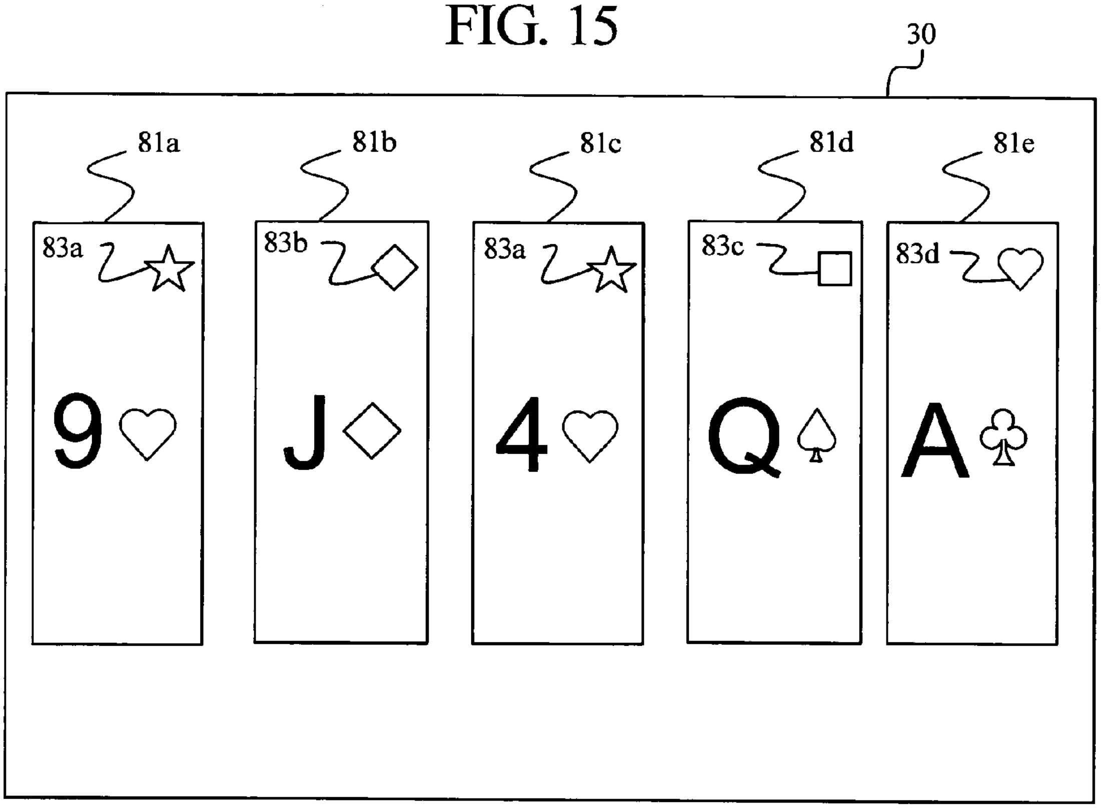
FIG. 15 is a front elevation view of a display device displaying a set of cards.
Figure 16:
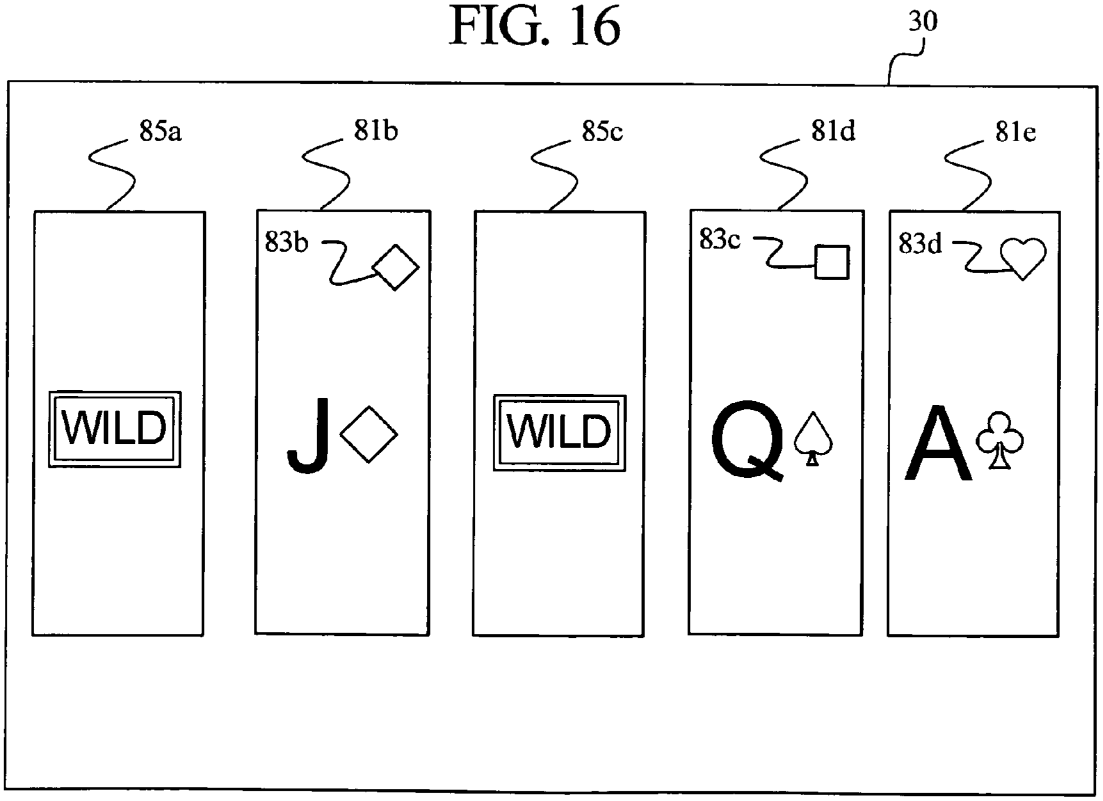
FIG. 16 is a front elevation view of a display device in which certain cards are transformed into wild cards.

In one embodiment, a plurality of cards display a wild indicator that is activated. For example, a set of cards 81*a* through 81*e* are displayed in FIG. 15. The first card 81*a* and third card 81*c* display a star wild indicator 83*a*. The processor determines that all star wild indicators are activated. Accordingly, the processor transforms cards 81*a* and 81*c* into wild cards 85*a* and 85*c*, respectively. The processor transforms the cards simultaneously as illustrated in FIG. 16. The player is awarded for receiving a straight.

Figure 17A:
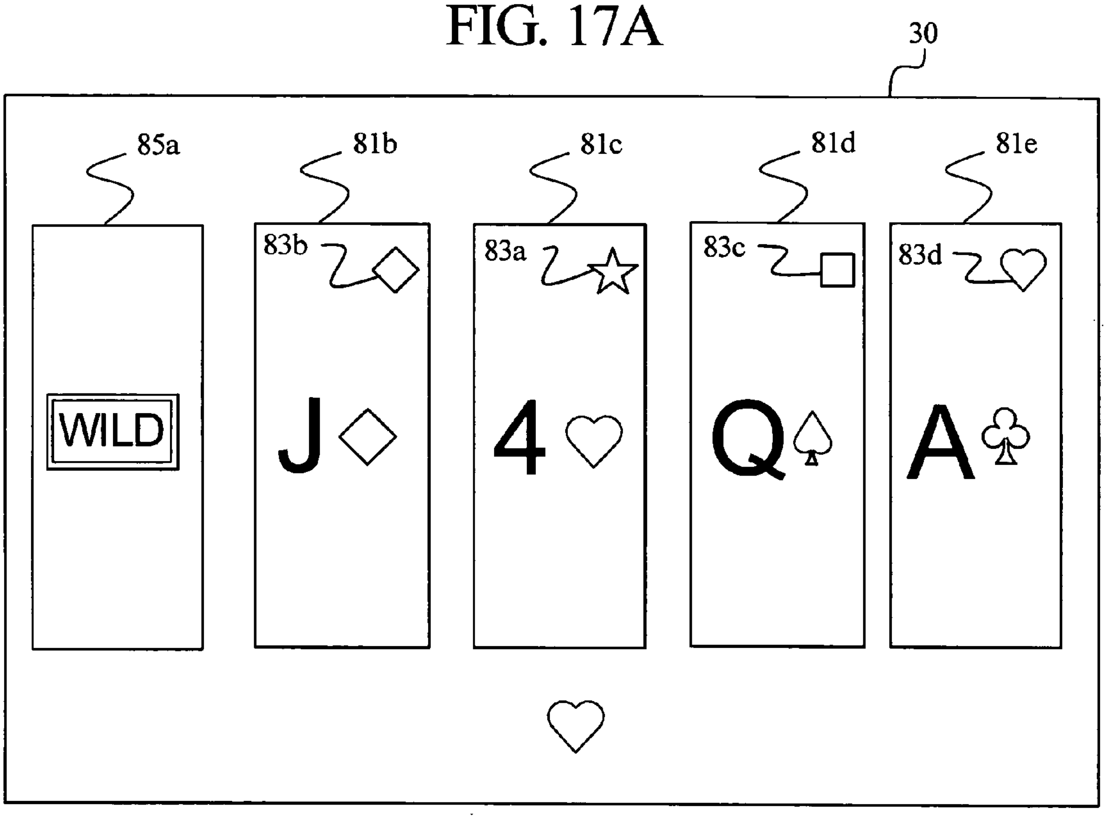
FIGS. 17A and 17B are front elevation views of a display device in which certain cards are transformed into wild cards successively.
Figure 17B:
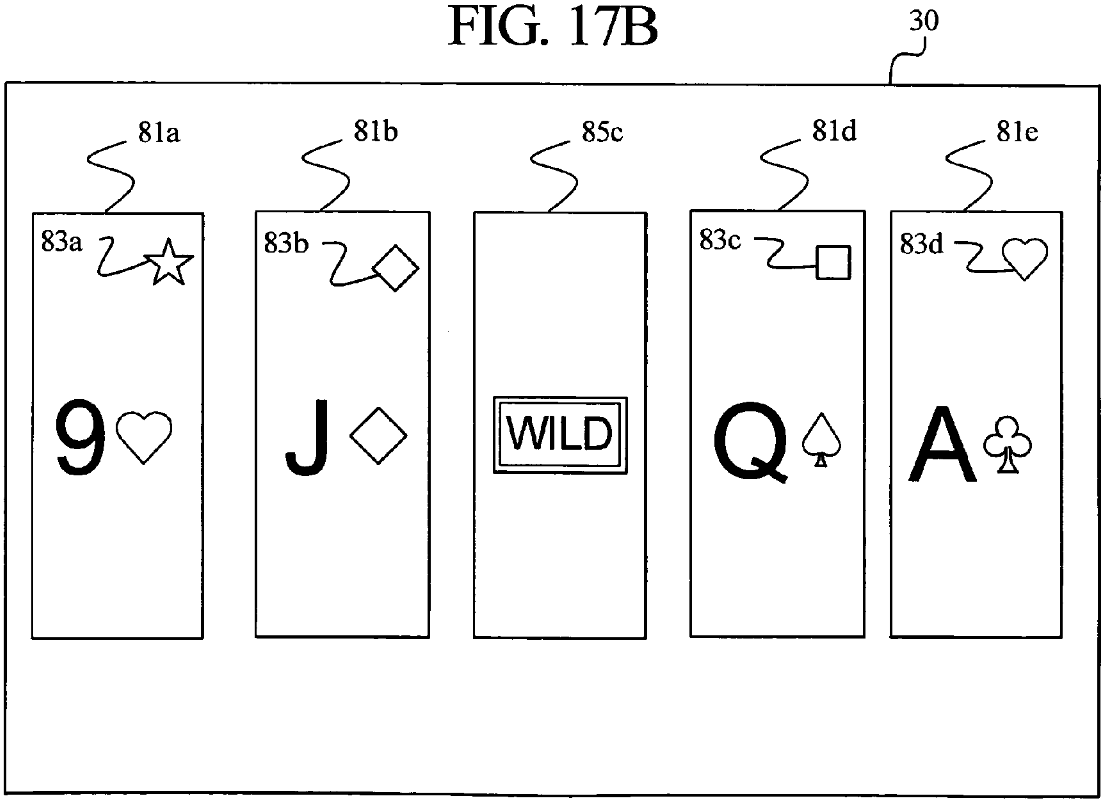

In one embodiment, the cards are transformed into wild cards successively. The transformed card reverts to its original state when the following card transforms into a wild card, as illustrated in FIGS. 17A and 17B. Thus, the processor could provide multiple awards for one set of cards.

In this embodiment, the wild indicators may also have a plurality of characteristics. The processor determines which wild indicator is activated based on a specific characteristic. For example, the first card may display a wild indicator in the form of a blue star and the third card may display a wild indicator in the form of a blue cherry. The processor, prior to dealing the cards, determines that all blue wild indicators will be activated. The processor then transforms the cards displaying the blue wild indicators into wild cards. The cards are transformed simultaneously or successively.

It should be appreciated that the wild indicators may be implemented in any other suitable primary or secondary game. It should also be appreciated that the processor may dependently or independently determine which, if any, wild indicators are associated with symbols and which, if any, wild indicators are activated. The processor may also randomly determine to simultaneously or successively change the symbols having associated activated wild indicators into wild symbols.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operated under the control of a processor, said gaming device comprising:

a game controlled by the processor;

a display device controlled by the processor and operable to display said game;

a plurality of symbols in said game;

at least one payline in said game;

a first wild indicator in said game, said first wild indicator having a predefined association with one of the symbols, wherein for each play of the game, a plurality of said symbols are generated in association with said at least one payline, and upon a generation of the symbol associated with the first wild indicator, the processor randomly determines if said first wild indicator is activated, wherein said determination is independent of a position of the symbol associated with the first wild indicator, and if said first wild indicator is activated, transforms said symbol associated with the first wild indicator into a wild symbol; and an award adapted to be provided to a player in the game based on the generated symbols associated with the payline including any wild symbols.

2. The gaming device of claim 1, including a plurality of first wild indicators, each first wild indicator having a predefined association with a different one of the symbols, and upon a generation of one of the symbols associated with one of the first wild indicators, the processor determines if the first wild indicator is activated, wherein said determination is independent of a position of the generated symbol associated with said first wild indicator, and if said first wild indicator is activated, transforms the generated symbol associated with the activated first wild indicator into a wild symbol.

3. The gaming device of claim 1, wherein the predefined association is a permanent association.

4. A gaming device operated under the control of a processor, said gaming device comprising:

a game controlled by the processor;

a display device controlled by the processor and operable to display said game;

a plurality symbols including a first symbol in said game;

at least one payline in said game;

a plurality of different wild indicators in said game, wherein one of the wild indicators has a predefined association with said first symbol for each play of the game in which said first symbol is generated, wherein in a play of the game, a plurality of said symbols are generated in association with said at least one payline, and upon a generation of the first symbol in said play of the game, the processor randomly determines if said wild indicator associated with the first symbol is activated, wherein said determination is independent of a position of said first symbol, and if said associated wild indicator is activated, transforms the first symbol into a wild symbol; and an award adapted to be provided to a player in the play of the game based on the generated symbols including any wild symbols.

5. The gaming device of claim 4, wherein the plurality of symbols includes a plurality of first symbols, and a different one of the wild indicators has a predefined association with each one of the first symbols for each play of the game in which said first symbol is generated.

6. The gaming device of claim 4, wherein the predefined association is a permanent association.

7. A gaming device operated under the control of a processor, said gaming device comprising:

a game controlled by the processor;

a display device controlled by the processor and operable to display said game;

a plurality of symbols including a first symbol in said game;

at least one payline in said game;

a plurality of different wild indicators in said game, each wild indicator associated with said first symbol, wherein in a play of the game, a plurality of said symbols are generated in association with said at least one payline, and upon a generation of the first symbol in said play of the game, the processor randomly determines which associated wild indicators are activated, wherein said determination is independent of a position of said first symbol, and if a predetermined number of said associated wild indicators is activated, transforms the first symbol into a wild symbol; and an award adapted to be provided to a player in a play of the game based on the generated symbols including any wild symbols.

8. The gaming device of claim 7, wherein the predetermined number of wild indicators is greater than two.

9. The gaming device of claim 7, wherein the plurality of symbols includes a second symbol and at least one of the wild indicators is associated with said second symbol, wherein in a play of the game, if the first symbol and the second symbol are generated and said wild indicator is activated, said processor also transforms the second symbol into a wild symbol.

10. A gaming device operated under the control of a processor, said gaming device comprising:

a game controlled by the processor;

a display device controlled by the processor and operable to display said game;

a plurality of symbols including a first symbol and a second symbol in said game;

at least one payline in said game;

a first wild indicator in said game having a predefined association with the first symbol and with the second symbol, wherein for each play of the game, a plurality of said symbols are generated in association with the at least one payline, and upon a generation of the first symbol or the second symbol, the processor randomly determines if the associated first wild indicator is activated, wherein said determination is independent of a position of said first symbol and of a position of said second symbol, and if the first wild indicator is activated, transforms each first symbol and each second symbol into a wild symbol; and an award adapted to be provided to a player in the game based on the generated symbols including any wild symbols.

11. The gaming device of claim 10, wherein the plurality of symbols includes a plurality of first symbols and a plurality of second symbols.

12. The gaming device of claim 10, wherein the predefined association is a permanent association.

13. A method for operating a gaming device having a game including a plurality of symbols, a first wild indicator having a predefined association with one of the symbols, and at least one payline, for each play of the game, said method comprising:

(a) generating a plurality of the symbols in association with said at least one payline;

(b) determining if the generated symbols include the symbol associated with first wild indicator, and if the generated symbols include the symbol associated with the first wild indicator:

i. randomly determining if the first wild indicator is activated, wherein said determination is independent of a position of said generated symbol associated with the first wild indicator, and ii. if the first wild indicator is activated, transforming the generated symbol associated with the activated first wild indicator into a wild symbol;

(c) determining if the generated symbols including any wild symbol include a winning combination; and (d) providing an award for any said winning combination.

14. The method of claim 13, which is operated through a data network.

15. The method of claim 14, wherein the data network is an internet.

16. The method of claim 13, wherein the predefined association is a permanent association.

17. A method for operating a gaming device having a game including a plurality of symbols, said plurality of symbols including a first symbol, a plurality of different wild indicators, wherein one of the wild indicators has a predefined association with said first symbol for each play of the game in which said first symbol is generated, and at least one payline, said method comprising:

(a) generating a plurality of the symbols in association with said at least one payline;

(b) determining if the generated symbols include the first symbol, and if the generated symbols include the first symbol:

i. randomly determining if the wild indicator associated with the generated first symbol is activated, wherein said determination is independent of a position of said generated first symbol, and ii. transforming the generated first symbol into a wild symbol if the wild indicator associated with said first symbol is activated;

(c) determining if the generated symbols including any wild symbols include a winning combination; and (d) providing an award for any winning combination.

18. The method of claim 17, wherein the plurality of symbols includes a plurality of first symbols, and a different one of the wild indicators has a predefined association with each one of the first symbols for each play of the game in which said first symbol is generated.

19. The method of claim 17, which is operated through a data network.

20. The method of claim 19, wherein the data network is an internet.

21. The method of claim 17, wherein the predefined association is a permanent association.

22. A method for operating a gaming device having a game including a plurality of symbols, said symbols including a first symbol, and a plurality of different wild indicators, each wild indicator associated with the first symbol, and at least one payline, said method comprising:

(a) generating a plurality of the symbols in association with said at least one payline;

(b) determining if the generated symbols include the first symbol, and if the generated symbols include the first symbol:

i. randomly determining if each of the wild indicators associated with the generated first symbol is activated, wherein said determination is independent of a position of said generated first symbol, and ii. transforming the generated first symbol into a wild symbol if a predetermined number of the wild indicators is activated;

(c) determining if the generated symbols including any wild symbols include a winning combination; and (d) providing an award for the winning combination.

23. The method of claim 22, wherein the number is greater than two.

24. The method of claim 22, which is operated through a data network.

25. The method of claim 24, wherein the data network is an internet.

26. A method for operating a gaming device having a game including a plurality of symbols, said plurality of symbols including a first symbol and a second symbol, a first wild indicator having a predefined association with said first symbol and said second symbol, and at least one payline, for each play of the game, said method comprising:

(a) generating a plurality of the symbols in association with said at least one payline;

(b) determining if the generated symbols include the first symbol and the second symbol, and if the generated symbols include the first symbol or second symbol:

i. randomly determining if the first wild indicator is activated, wherein said determination is independent of a position of said generated first symbol and said generated second symbol, ii. if said first wild indicator is activated, transforming each generated first symbol into a wild symbol, and transforming each generated second symbol into a wild symbol;

(c) determining whether the generated symbols including any wild symbols include a winning combination; and (d) providing an award for the winning combination.

27. The method of claim 26, wherein the plurality of symbols includes a plurality of first symbols and a plurality of second symbols.

28. The method of claim 26, wherein said transforming occurs in a predetermined order.

29. The method of claim 26, which is operated through a data network.

30. The method of claim 29, wherein the data network is an internet.

31. The method of claim 26, wherein the predefined association is a permanent association.

* * * * *